United States Patent
Peracha

(10) Patent No.: US 7,797,415 B2
(45) Date of Patent: Sep. 14, 2010

(54) AUTOMATIC CONTEXT-BASED BASELINING FOR TRANSACTIONS

(75) Inventor: Zahur Peracha, Union City, CA (US)

(73) Assignee: Computer Associates Think, Inc., Islandia, NY (US)

(*) Notice: Subject to any disclaimer, the term of this patent is extended or adjusted under 35 U.S.C. 154(b) by 135 days.

(21) Appl. No.: 12/111,619

(22) Filed: Apr. 29, 2008

(65) Prior Publication Data

US 2009/0271511 A1 Oct. 29, 2009

(51) Int. Cl.
- G06F 15/173 (2006.01)
- G06F 17/50 (2006.01)
- G06F 17/18 (2006.01)

(52) U.S. Cl. .............. 709/223; 705/7; 702/181
(58) Field of Classification Search .............. None
See application file for complete search history.

(56) References Cited

U.S. PATENT DOCUMENTS

| | | | |
|---|---|---|---|
| 6,260,187 B1 * | 7/2001 | Cirne | 717/110 |
| 7,065,566 B2 * | 6/2006 | Menard et al. | 709/223 |
| 7,310,590 B1 * | 12/2007 | Bansal | 702/181 |
| 7,512,935 B1 * | 3/2009 | Cobb | 717/130 |

* cited by examiner

Primary Examiner—Wen-Tai Lin
(74) Attorney, Agent, or Firm—Vierra Magen Marcus & DeNiro LLP

(57) ABSTRACT

Application health is determined by calculating baseline deviation for one or more transactions based on past data having the same context as current data being examined. The performance data is generated in response to monitoring one or more applications that perform transactions during a time period. The performance data may include transaction metric data and the context data describing conditions under which one or more transactions were performed. A baseline is determined by predicting current or recent transaction performance data values using past transaction performance data associated with the same context. Based on the comparison of the actual and predicted data with the same or similar context, a deviation from the baseline value is determined for the transaction and reported, for example to a user through an interface.

22 Claims, 18 Drawing Sheets

AUTOMATIC CONTEXT-BASED BASELINING FOR TRANSACTIONS

BACKGROUND

The growing presence of the Internet and other computer networks such as intranets and extranets has brought about the development of applications in e-commerce, education and other areas. Organizations increasingly rely on such applications to carry out their business or other objectives, and devote considerable resources to ensuring that the applications perform as expected. To this end, various application management techniques have been developed.

One approach for managing an application involves monitoring the application, generating data regarding application performance and analyzing the data to determine application health. Some system management products analyze a large number of data streams to try to determine a normal and abnormal application state. Large numbers of data streams are often analyzed because the system management products don't have a semantic understanding of the data being analyzed. Accordingly, when an unhealthy application state occurs, many data streams will have abnormal data values because the data streams are causally related to one another. Because the system management products lack a semantic understanding of the data, they cannot assist the user in determining either the ultimate source or cause of a problem. Additionally, these application management systems may not know under what conditions a set of data was obtained, making it even more difficult to identify whether there is truly a problem with an application.

SUMMARY

The present technology, roughly described, automatically determines application health based on baseline deviation for one or more transactions performed by the application within a particular context. Performance data is generated in response to monitoring application execution. The performance data may include transaction metric data and context data describing conditions under which one or more transactions were performed. The performance data is processed to determine a baseline for each transaction metric in the context in which the transaction was performed. The baseline data may include predicted or expected transaction metric values that are compared to a time series of actual past metric values for the transaction in the same or similar context. Based on the comparison, a deviation from the baseline value is determined for the metric. Deviation information for the time series data is then reported, for example to a user through an interface.

The context may be transaction type specific and indicate information about the transaction for a particular time period. For example, context data may include error rate, throughput and concurrency that are experienced for a particular transaction during the time period. The time period may be a set time period such as 10 seconds, 15 seconds, 30 seconds, or some other time period.

In one embodiment, the deviation information may be associated with a deviation range. A number of deviation ranges can be configured to extend from a predicted value of a data point. The actual data point value is contained in one of the ranges depending on how far the actual data point deviates from the predicted value. The deviation information for the actual data point with respect to the predicted data point may be communicated through an interface as an indication of deviation level (e.g., low, medium, high) and updated as additional data points in the time series are processed.

The deviation information may be provided through an interface as health information for a resource. In one embodiment, the interface may provide health and/or performance information associated with resources used by a business application, transaction, or some other computer process. A transaction is a process performed to generate a response to a request, and a business application is a set of transactions.

An embodiment of the technology accesses performance data generated from monitoring an application. The accessed performance data is associated with one or more transactions that process requests. Next, a first context is determined for a portion of the performance data associated with each transaction. The first context for each portion of the performance data is associated with a selected time period during which the transaction was performed. A value is then predicted for the accessed performance data using prior performance data. The prior performance data is associated with the same one or more transactions and has a second context for each transaction. The second context has the same value as the first context for each transaction and is associated with a time period occurring previously with respect to the time period associated with the first context. A deviation is then identified between the accessed performance data and the predicted values for the performance data and baseline deviation information derived from the deviation is reported.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1:
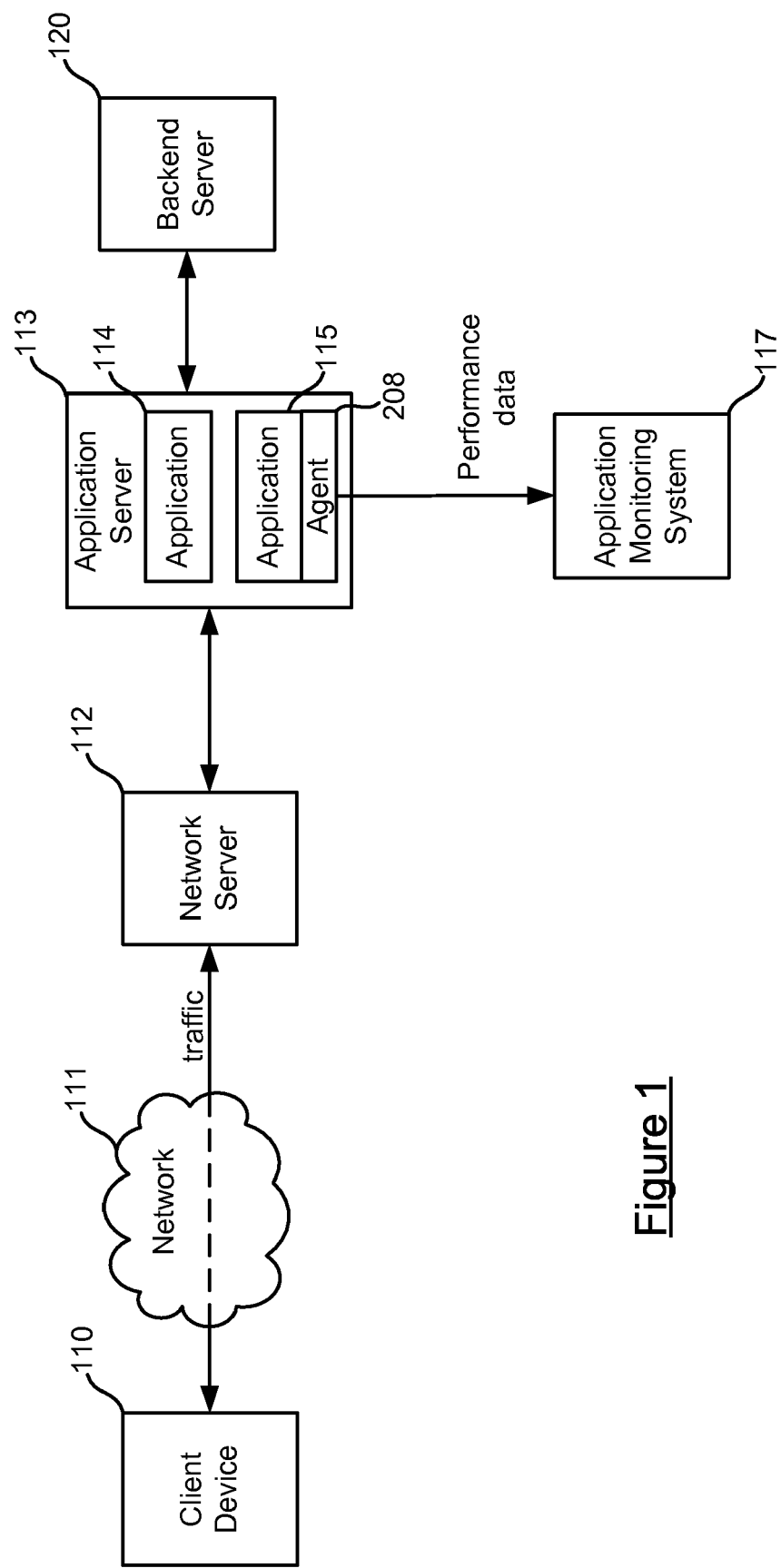
FIG. 1 is a block diagram of an embodiment of a system for determining transaction performance and resource usage.

Application health is determined by calculating baseline deviation for one or more transactions. A baseline is determined for one or more transaction metrics derived from performance data having a context. The performance data is generated in response to monitoring one or more applications that perform the transactions during a time period associated with the context. The performance data may include transaction metric data and the context data describing conditions under which one or more transactions were performed. A baseline is determined by processing performance data associated with each transaction metric and a context in which the transaction was performed. Baseline data may include predicted or expected transaction metric values that are compared to a time series of actual metric values for the transaction in the same or similar context. Based on the comparison for data having the same or similar context, a deviation from the baseline value is determined for the transaction metric and reported, for example to a user through an interface. Determining a baseline for transactions metric using performance data having the same context allows for more accurate prediction of metric values and more reliable determinations of whether an application or transaction is performing as expected.

The context may be transaction type specific and indicate information about the transaction for a particular time period. For example, context data may include error rate, throughput and concurrency experienced for a particular transaction during the time period. The time period may be a set time period such as 10 seconds, 15 seconds, 30 seconds, or some other time period. The timer period may be a series of non-overlapping period or time window, overlapping windows, or some other variation of time window.

In one embodiment, the deviation information reported to a user is based on a deviation range for the actual data point value. A number of deviation ranges can be generated based on the predicted value. The actual data point will be contained in one of the ranges, wherein the deviation associated with the range is proportional to how far the range is from the predicted value. For example, a range that contains the predicted value may be associated with a low deviation, a range adjacent to the low deviation range may have a medium deviation, and another range adjacent to the medium deviation range may have a high deviation. An indication of which range contains the actual data point value may be presented to a user through an interface and updated as different data points in the time series are processed.

In some embodiments, a deviation range may be selected for a time series data point based on two or more predicted values for the data point. When predicting values, two or more functions may be fit to past time series values and used to calculate future data point values in the series data. Deviation ranges are configured for each predicted value, and each predicted value is contained in one of its corresponding ranges. The different predicted values and corresponding deviation ranges are processed to select an overall deviation range based on highest number of occurrences, degree of deviation, and/or other factors.

In some embodiments, the baseline deviation may be expressed in terms of a transaction, business application, or some other computer process. A transaction is a set of operations performed to process a request received by an application. The operations may be performed by application components, such as EJBs, servlets and other components, and computer processes invoked by the components, such as a backend, database or other process or system. A business application is a set of transactions defined by a user or in some other manner. A metric may be a performance indicator for a transaction, such as response time or average response time, or some other measurable quantity associated with a transaction performed in response to a request. A request may be a "real" customer request or a synthetic request.

In some embodiments, an application may perform a transaction by associating the transaction with a thread. Once a thread is associated with a transaction, the resource utilization associated with the thread is determined. Performance data associated with application runtime may be generated based on monitoring classes, methods, objects and other code within the application. The thread may handle instantiating classes, calling methods and other tasks to perform the transaction associated with the thread. The performance data is then reported, in some embodiments the data is aggregated, and the resulting data is analyzed to determine resource usage of one or more resources for one or more individual transactions.

FIG. 1 is a block diagram of an embodiment of a system for determining transaction performance and resource usage. The block diagram of FIG. 1 includes client device 110, network server 112, application server 113, backend server 120 and application monitoring system 117. Client device 110 and network server 112 communicate over network 111, which may be implemented as a private or public network, the Internet, an intranet, or some other network. In some embodiments, servers 112, 113 and 120 and system 117 may also communicate over a network similar to network 111. Each of servers 112, 113 and 120 may represent one or more servers.

Client device 110 may be implemented as a server, computing device or some other machine that sends requests to network server 112. Network server 112 may provide a network service to client device 110 over network 111. In one embodiment, network server 112 may be implemented as a web server and implement a web service over the Internet. Network server 112 may receive a request from client device 110, process the request and send a response to client device 110. In processing requests, network server 112 may invoke an application on application server 113. The invoked application will process the request, provide a response to network server 112, and network server 112 will provide a corresponding response to client device 110.

Application server 113 includes application 114, application 115 and agent 208. Though not illustrated in FIG. 1, application server 113 may contain more or less than two applications and any application may be monitored by agent 208 or another agent. Applications 114-115 may process requests received from network server 112. In some embodiments, each of applications 114-115 may process a request by receiving the request, generating a response and sending the response to network server 112. In some embodiments, generating a response by an application may include sending a request to of backend server 120. The application response is then generated based on a response received from the invoked backend server. Application 113 is discussed in more detail below with respect to FIG. 1B.

Agent 208 generates performance data in response to monitoring execution of application 115 and provides the performance data to application monitoring system 117. Generation of performance data is discussed in more detail below. Application monitoring system 117 processes performance data reported by agent 208. In some embodiments, the processing of performance data includes providing resource usage and/or performance information to a user through an interface. Application monitoring system 117 is discussed in more detail below with respect to FIG. 2B.

Backend server 120 may process requests from applications 114-115 of application server 113. Backend servers 120 may be implemented as a database, another application server, or some other remote machine in communication with application server 113 that provides a service or may process requests from an application on application server 113. In some embodiments, backend server 120 may be implemented as a remote system that receives requests from an application, processes the request and provides a response. For example, the backend could be another network service.

In one embodiment, the technology herein can be used to monitor behavior of an application on an application server (or other server) using bytecode instrumentation. The technology herein may also be used to access information from the particular application. To monitor the application, an application management tool may instrument the application's object code (also called bytecode).

Figure 2A:
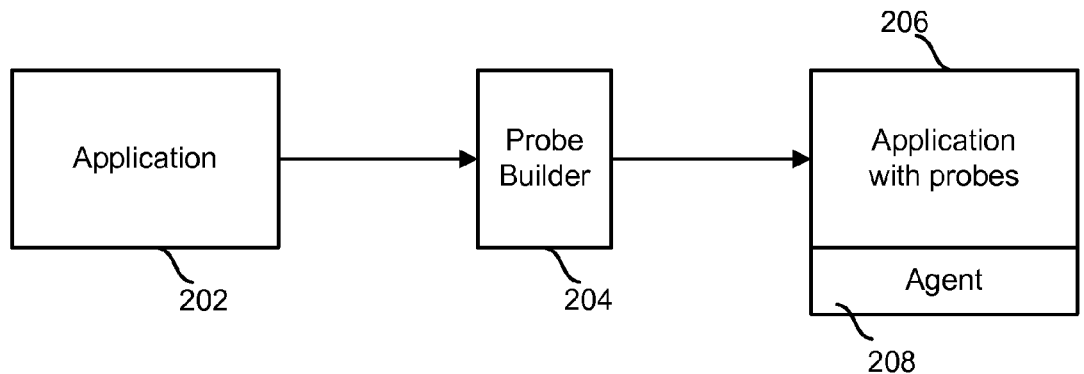
FIG. 2A is a block diagram of a system describing how byte code is instrumented.

FIG. 2A depicts an exemplar process for modifying an application's bytecode. FIG. 2A shows Application 202, Probe builder 204, Application 115 with probes and Agent 208. Application 115 includes probes used to access information from the application, and application 202 is the application before the probes are added. Application 202 can be a Java application or a different type of application.

Probe builder 204 instruments (e.g. modifies) the bytecode for Application 202 to add probes and additional code to Application 202 in order to create Application 115. The probes may measure specific pieces of information about the application without changing the application's business logic. Probe builder 204 also generates Agent 208. Agent 208 may be installed on the same machine as Application 115 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2B:
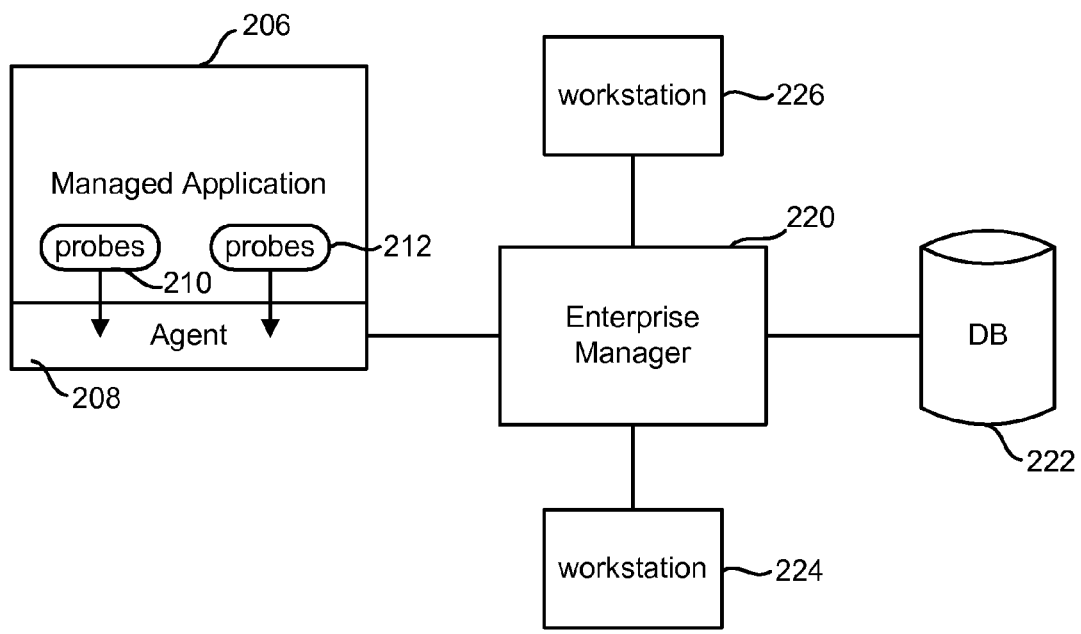
FIG. 2B is a block diagram of a system for monitoring an application.

FIG. 2B is a block diagram of a system for monitoring an application. In one embodiment, the block diagram of FIG. 2B provides more information for managed application 115 and application monitoring system 117 of FIG. 1.

FIG. 2B is a conceptual view of the components of the application performance management tool. In some embodiments, enterprise manager 210, work stations 224-226 and database 222 of FIG. 2B comprise application monitoring system 117 of FIG. 1. In addition to managed application 115 with probes 206 and 208, FIG. 2B also depicts Enterprise manager 210, database 216, workstation 212 and workstation 214. As a managed application runs, probes (e.g. 206 and/or 208) relay performance data to Agent 208. In one embodiment, probes 206 and 208 may be implemented in objects and other code that write data, change data or otherwise cause the state of an application server to change. In some embodiments, agent 208 may communicate with JVM on application server 113, operations system 149 and other modules on application server 113 to retrieve resource data. Agent 208 then collects, summarizes and sends the data to Enterprise Manager 210.

As used herein, an "object" is a collection of data or operations, intended to possibly contain both data and operations or only data or only operations. It is not intended that the term "object" be limited to the use of an object-oriented computer language. Rather, it should be understood that objects and object-oriented techniques can be used in many programming languages Enterprise Manager 210 receives performance data from managed applications via Agent 208, runs requested calculations, makes performance data available to workstations 212-214 and optionally sends performance data to database 216 for later analysis. The workstations (e.g. 212 and 214) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In some embodiments, other the natural language tool can be implemented in the console window, explorer window and other windows within an interface.

In one embodiment of the system of FIG. 2B, each of the components is running on different machines. That is, workstation 212 is on a first computing device, workstation 214 is on a second computing device, Enterprise manager 210 is on a third computing device, and Managed Application 115 is running on a fourth computing device. In another embodiment, two or more (or all) of the components are operating on the same computing device. For example, Managed Application 115 and Agent 208 may be on a first computing device, Enterprise manager 210 on a second computing device and a workstation on a third computing device. Alternatively, all of the components of FIG. 2B can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 2C:
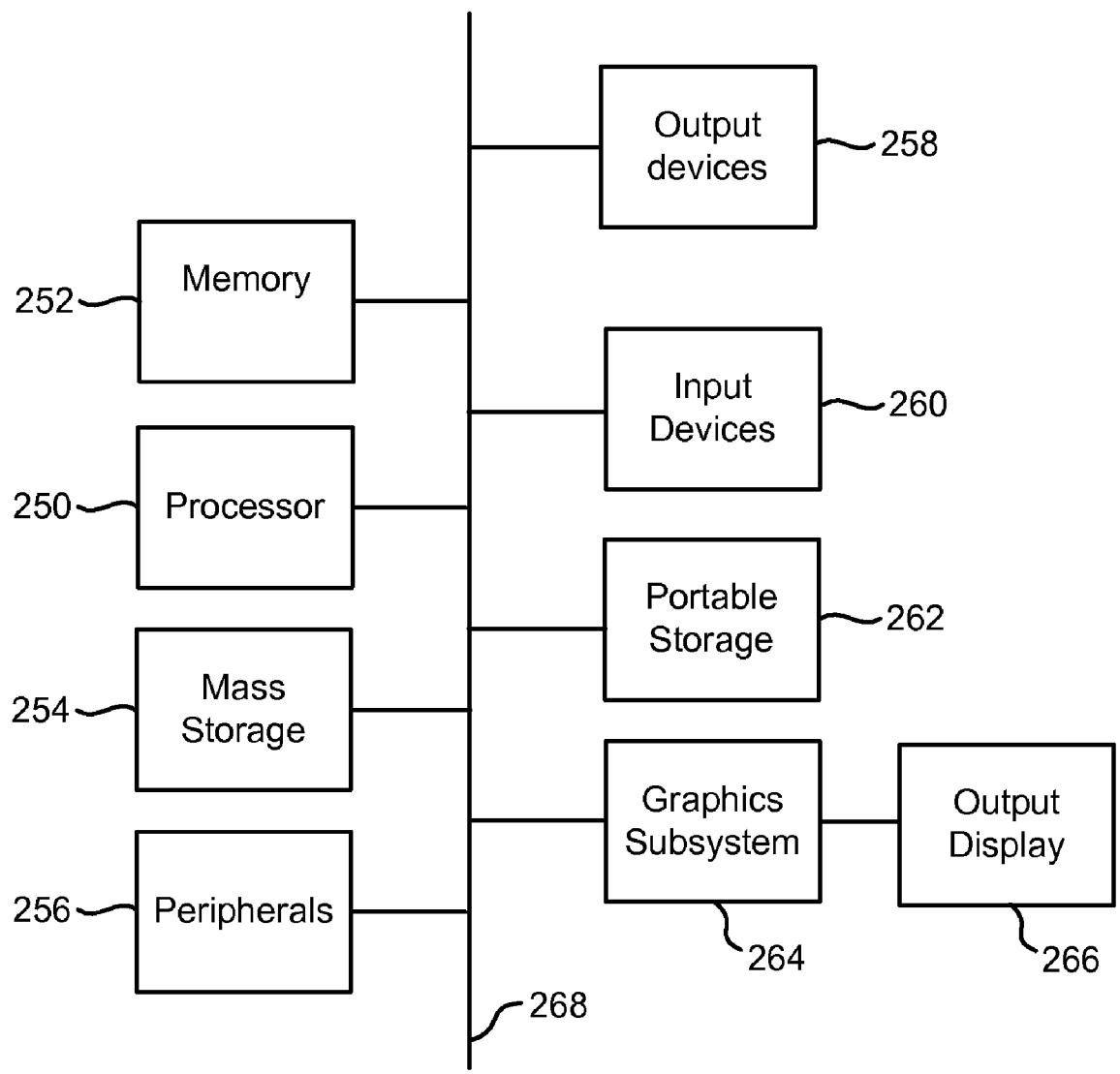
FIG. 2C illustrates a computing system in which the systems of the present invention may be implemented.

FIG. 2C illustrates a computing system in which the system of the present technology may be implemented. In some embodiments, the computing system of FIG. 2C may be used to implement client computer 110, application server 113, backend server 120, workstations 224 and 225 and database 222.

The computer system of FIG. 2C includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2C further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2C are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 2C. In one embodiment, the system software for implementing the present invention is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2C includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2C includes output devices 258. Examples of suitable output devices include speakers, printers, network interfaces, monitors, etc.

The components contained in the computer system of FIG. 2C are those typically found in computer systems suitable for use with the present invention, and are intended to represent a broad category of such computer components that are well known in the art. Thus, the computer system of FIG. 2C can be a personal computer, hand held computing device, telephone, mobile computing device, workstation, server, mini-computer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 3:
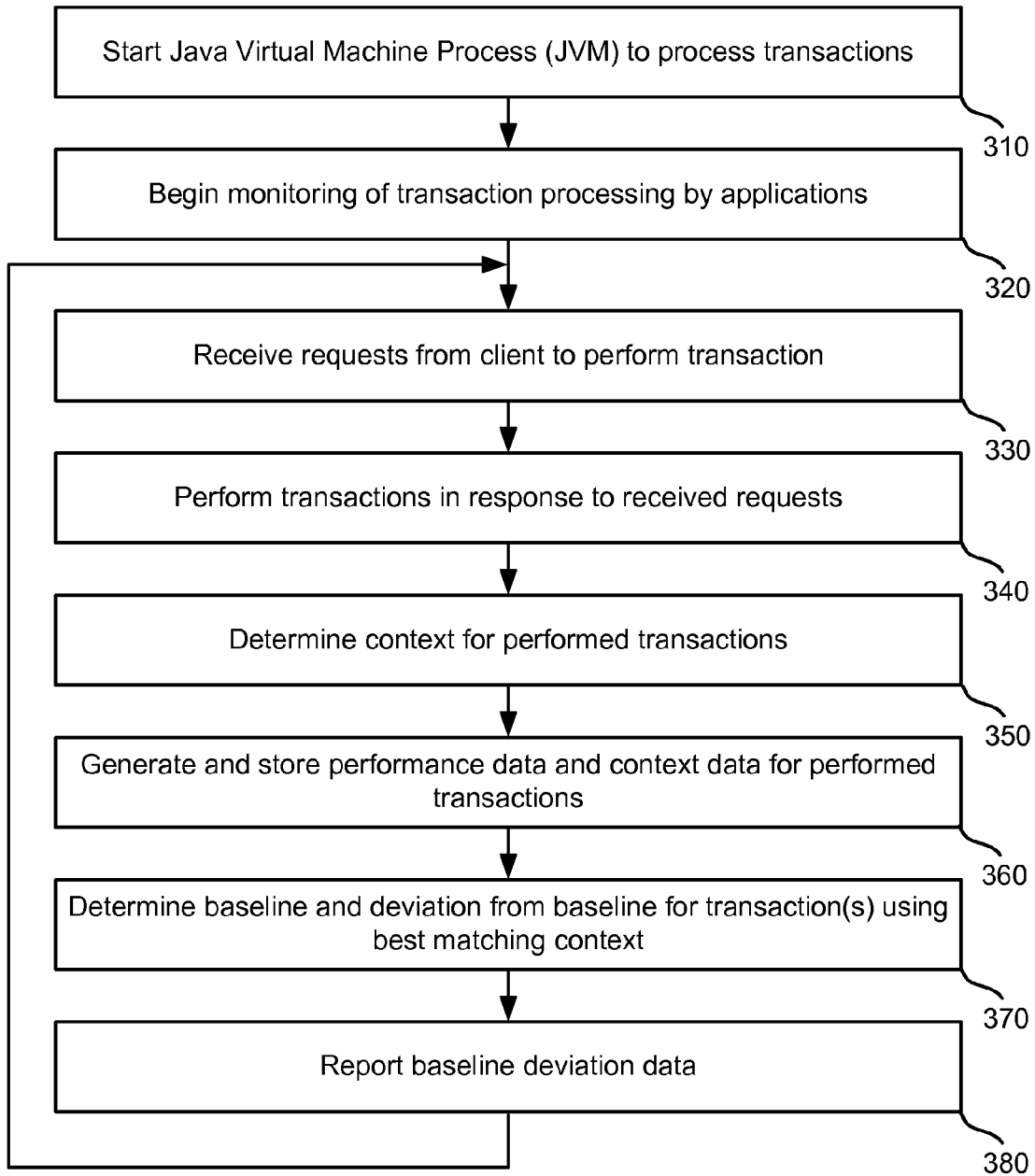
FIG. 3 is a flowchart of an embodiment of a method for determining and reporting baseline deviation data.

FIG. 3 is a flowchart of an embodiment of a method for determining and reporting baseline deviation data. The method of FIG. 3 may be performed by application monitoring system 117 with one or more agents, such as agent 208, of the system of FIG. 1. A java virtual machine process is started to process transactions at step 310. Starting the JVM process may include performing initiation of application monitoring system 117, installing and initiating one or more agents on an application server, and other initialization tasks. Next, monitoring of applications which process transactions is begun at step 320. The monitoring of the applications may include identifying when a request is received by an application or server, when a response to the request is transmitted, and transaction execution to process the request by one or more applications. For example, application monitoring system 117 of FIG. 1 may monitor transaction execution by applications 114 and 115 of server 113. In some embodiments, one or more of network server 112, backend server 120, or some other server directly or indirectly affecting the performance of a transaction or value of a transaction related metric may be monitored in addition to or instead of application server 113.

Requests are received from a client to perform a transaction at step 330. With respect to FIG. 1, requests may be received by application server 113 from network server 112 which in turn has received one or more requests from client device 100 over network 111. In some embodiments, the requests may originate from some other source other than client device 110. Transactions are performed in response to the received requests at step 340. The transactions may be performed by network server 112, application server 113, back on server 120, a combination of these and/or other servers, machines or devices.

A context is determined for the performed transactions at step 350. The context may identify statistics or other parameters for a period of time during which transactions were performed. For example, a context may identify an error rate, throughput, concurrency, and/or other features for a particular transaction during a particular time period. A context may be determined by an agent within an application server, such as agent 208 of application 115, by an application monitoring system, or some other hardware or software. Determining context for one or more performed transactions is discussed in more detail below with respect to FIG. 4.

Performance data and context data is generated and stored for one or more performed transactions at step 360. In some embodiments, one or more agents may generate the performance data in response to monitoring application components. The performance data may also include information regarding messages and data received by and sent from an application or application server. The performance data may be stored temporarily by the agent and/or provided to application monitoring system 117 for storage. In any case, either the agent or application monitoring system 117, for example enterprise manager 220, may store performance data.

Next, a baseline and deviation from the baseline are determined for transactions using a best matching context at step 370. The baseline may be determined from previous performance data for a transaction having a particular context. Once the baseline is determined, the deviation or the amount by which the current performance data differs from that baseline is determined. Determining a baseline and deviation from the baseline is discussed in more detail below with respect to FIG. 10.

Baseline deviation data is reported at step 380. The baseline deviation data may include transaction information, baseline information, deviation information, and other hardware and/or software data related to the transaction. The data can be reported using any of several communication means, including a printer, facsimile, pager, mobile device data message (such as short message service (SMS), wireless application protocol (WAP), and so on), email, telephone, computer interface, to a storage device, or some other means. In some embodiments, the data may be reported through an interface provided by application monitoring system 117. An example of an interface is provided discussed below with respect to FIG. 17. Reporting baseline deviation data is discussed in more detail with respect to FIG. 16.

Figure 4:
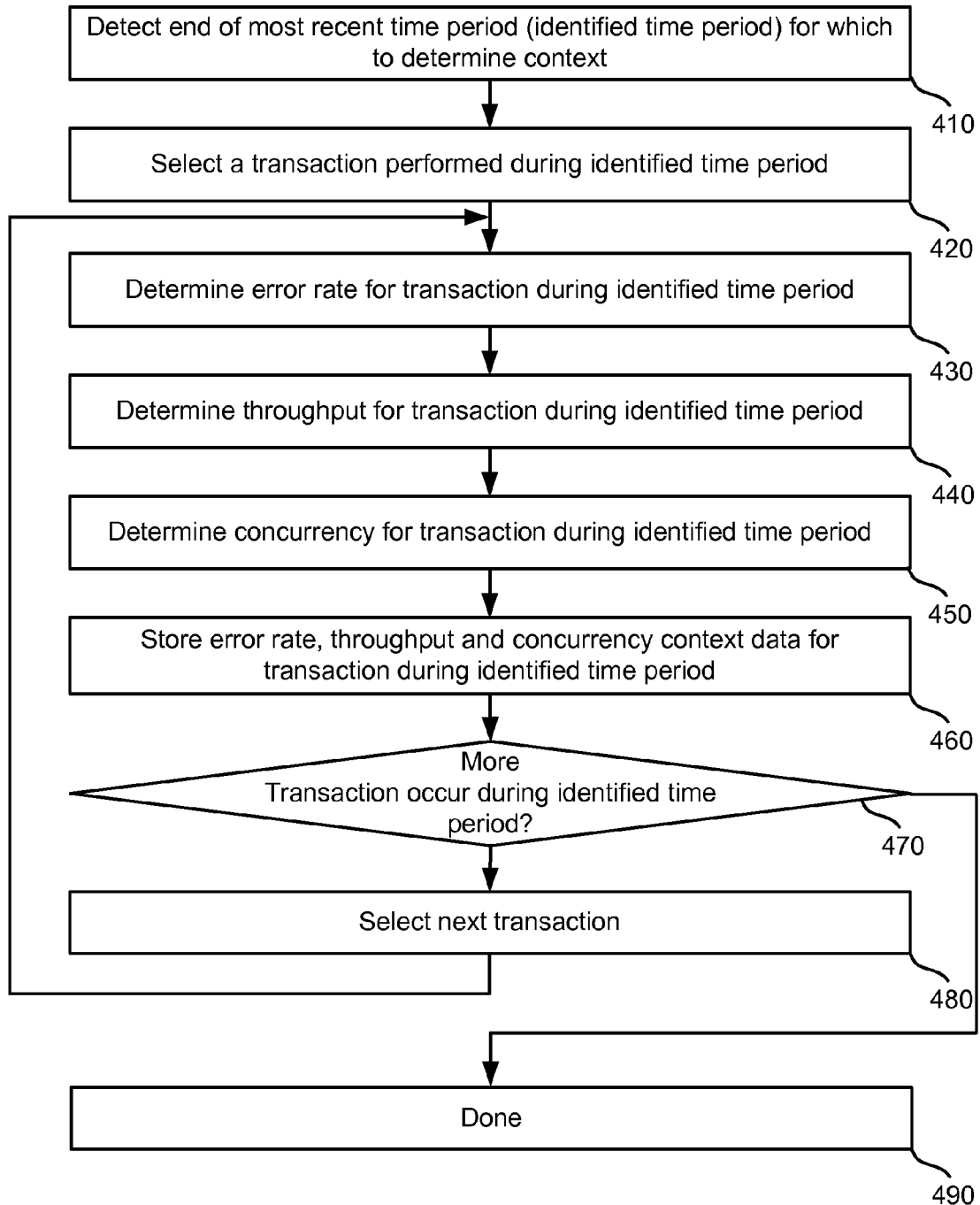
FIG. 4 is a flowchart of an embodiment of a method for determining context for performed transactions.

FIG. 4 is a flowchart of an embodiment of a method for determining context for performed transactions. In some embodiments, the method of FIG. 4 provides for detail for step 350 of the method of FIG. 3. First, the end of the most recent time period is detected for which to determine a context at step 410. In some embodiments, performance data is generated constantly during application monitoring by reported periodically. The context for a particular transaction may be determined at the end of the reporting period. Thus, the end of the most recent time period may be the end of the most recent time period in which the agent reported data. For example, agent 208 in the system of FIG. 1 may report data every 15 seconds. For purposes of discussion, the most recent time period shall be referred to as the identified time period.

A transaction type performed during the identified time period is then selected at step 420. The selected transaction type may be one of several transaction types performed during the identified time period. In some embodiments, each type is associated with a particular uniform resource locator (URL).

After selecting a transaction which occurred during the identified time period, the context for the transaction during that time period is determined. Steps 430-450 involve determining parameters of a time period. An error rate is determined for the selected transaction type with respect to the identified time period at step 430. A transaction error rate may specify a portion of a context and is determined by calculating the ratio of the number of transactions which ended in error for the transaction type with respect to the total number of transactions initiated during the identified time period. Determining the error rate for a transaction during the identified time period is discussed in more detail below with respect to FIG. 5.

The throughput for the selected transaction type with respect to the identified time period is determined at step 440. The throughput value may be part of a context for the transaction and has a value of the number of transactions performed during the identified time period for that transaction type. Returning a through-put for a transaction is discussed in more detail below with respect to FIG. 6. A concurrency for a selected transaction type during the identified time period is determined at step 450. The concurrency may be defined as the average number of transactions performed during a particular time period. In some embodiments, concurrency may be determined by processing performance data for transactions that have ended. More detail is provided for determining the concurrency of transactions which have ended with respect to FIG. 7-8. In some embodiments, other methods may be used to determine concurrency, such as querying monitoring software, an operating system, or some other hardware and/or software which tracks concurrency.

The determined error rate, throughput and concurrency for the selected transaction are stored as context data for the transaction at step 460. The error rate, throughput and concurrency are stored along with the identified transaction type and time period. Next, a determination is made as to whether more transactions have occurred during the identified time period at step 470. Addition transactions may be any transaction not considered the same instance as the transaction selected at step 420, for example transactions having a different URL. If additional transactions have been performed during the identified time period, then the next transaction type is selected at step 480 and the method of FIG. 4 returns to step 430. If no additional transactions occurred, then the method of FIG. 4 is complete at step 490.

Figure 5:
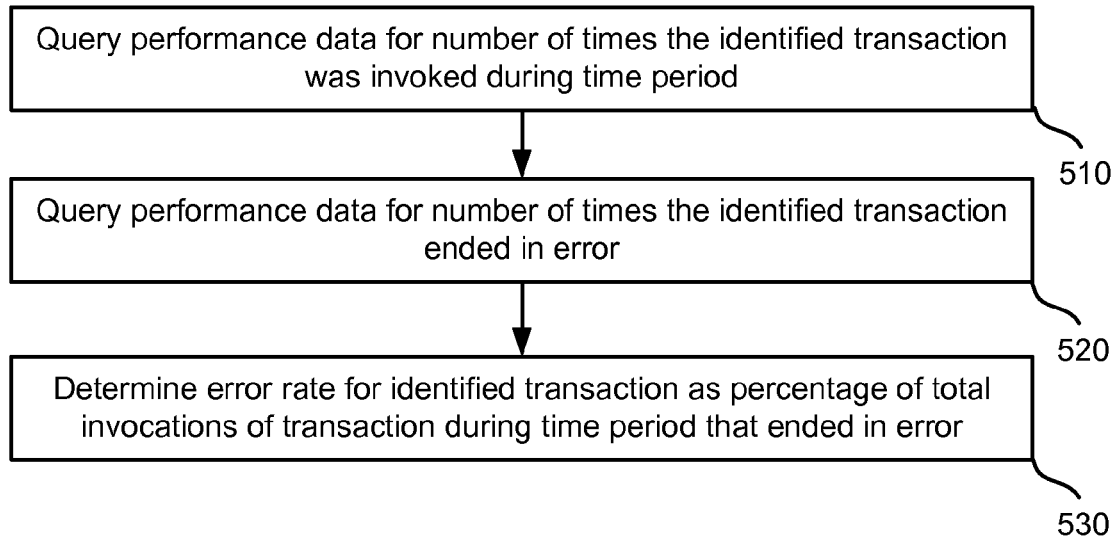
FIG. 5 is a flowchart of an embodiment of a method for determining error rate for transactions during identified time periods.

FIG. 5 is a flowchart of an embodiment of a method for determining error rate for a transaction during an identified time period. In some embodiments, the method of FIG. 5 provides more detail for step 430 of the method of FIG. 4. First, performance data is queried for the number of times that the identified transaction was invoked during the identified time period at step 5 10. The query results should indicate the total invocations during the time period for the particular transaction.

Next, the performance data is then queried for the number of transaction invocations during the identified time period which ended in error at step 520. In some embodiments, the query for transactions ending in error may specify that the transaction ended in error during the identified time period or a later time period. Because the query may be for the identified time period or a later period, the error rate determination may be performed some time after the identified time period ends. In any case, the query will return the number of invocations during the identified time period that did not end successfully. Next, the error rate is determined for the identified transaction during the identified time period as the percentage of the total invocations of the transaction during the identified time period that ended in error at step 530. For example, if 13 errors occurred out of 1,000 total transaction invocations during a time period, the error rate would be 1.3%.

Figure 6:
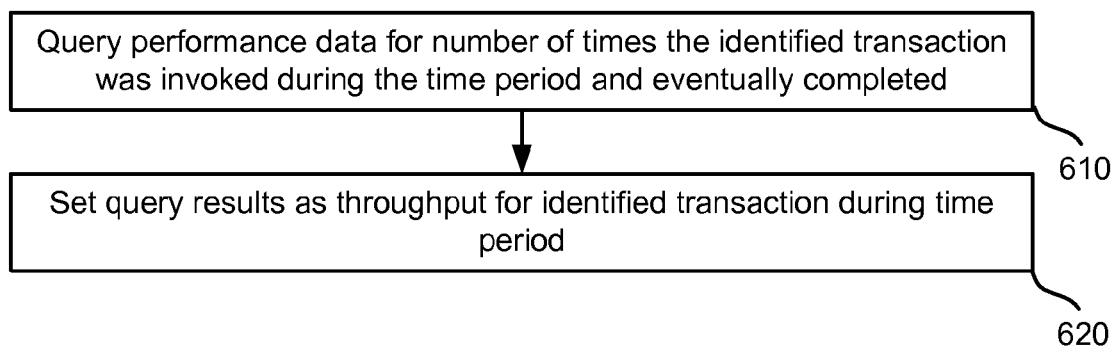
FIG. 6 is a flowchart of an embodiment of a method for determining throughput for a transaction.

FIG. 6 illustrates a method for determining throughput of a transaction during an identified time period. In some embodiments, FIG. 6 provides more detail for step 440 of the method in FIG. 4. First, performance data is queried for the number of times which the identified transactions was invoked during the time period and eventually completed ate step 610. The results of the query are set as the throughput for the identified transaction during the time period at step 620.

Figure 7:
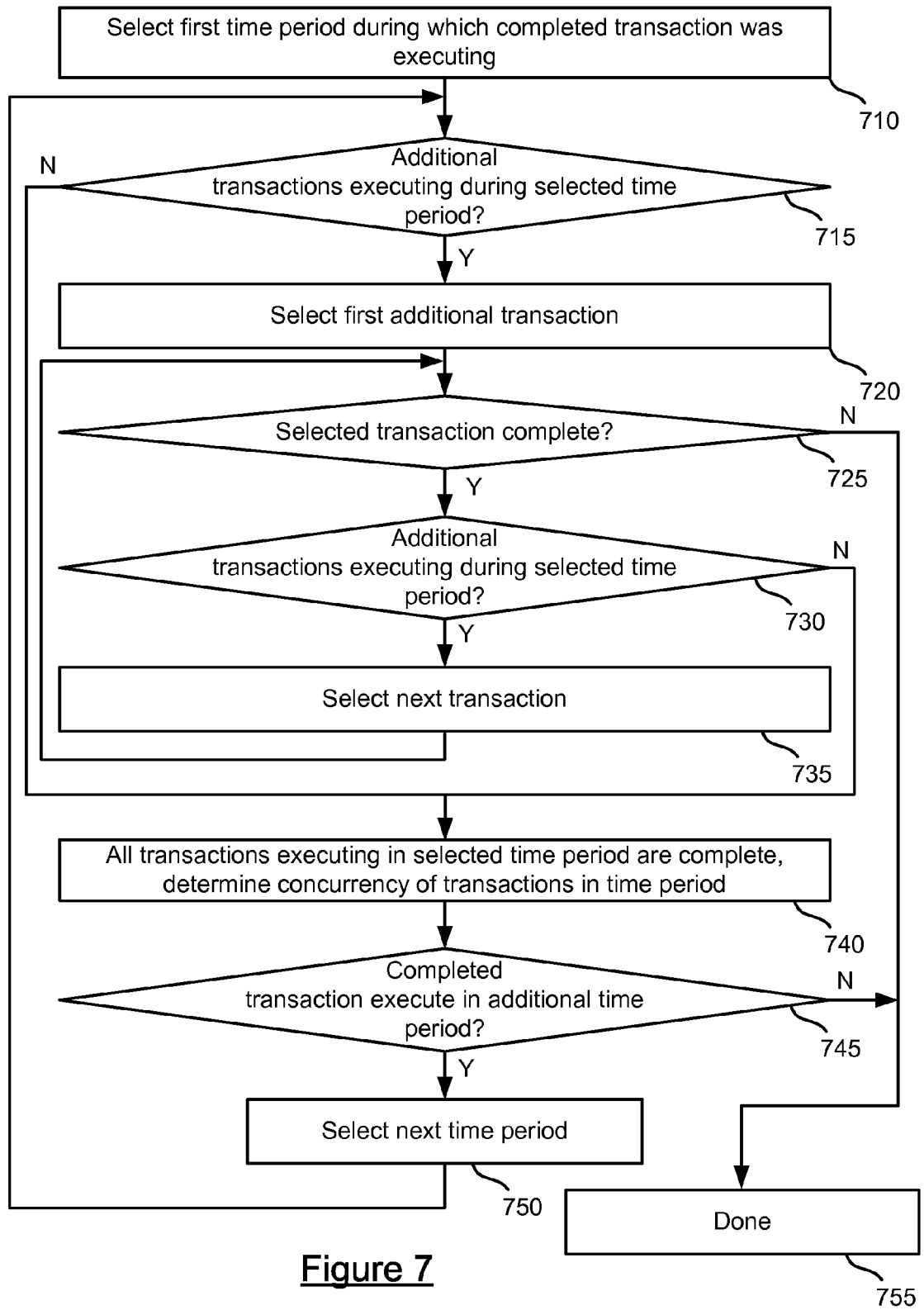
FIG. 7 is a flowchart of an embodiment of a method for determining concurrency for a transaction.

FIG. 7 illustrates a flowchart of a method for determining concurrency for transactions during the identified time period. In some embodiments, FIG. 7 provides more detail for step 450 of the method in FIG. 4. First, a first time period during which a completed transaction was executing is selected at step 710. For example with respect to FIG. 9, the first time period during which completed business transaction 1 is executing is the time period ending at fifteen seconds. If the completed transaction was business transaction 4, the first time period during which the completed transaction was executing would be the time period of 30-45 seconds.

A determination is made as to whether additional transactions were executing during the selected time period at step 715. For example, for the time period of 0-15 seconds and completed business transaction 1, business transaction 2 was an additional transaction that was executing during the selected time period. In the third time period of 30-45 seconds and with completed business transaction 4, business transaction 3 and business transaction 5 were also executing. If no additional transactions were executing during the selected time period, the method of FIG. 7 continues to step 740. If additional transactions were executing, the first additional transaction is selected at step 720 and a determination is made as to whether the additional transaction is complete at step 725.

If the selected additional transaction is not complete at step 725, then the method of FIG. 7 ends at step 755. When the selected additional transaction is not complete, at least one additional transaction is still executing and concurrency data may not be determined for any transaction within the selected time period. If the selected transaction is complete, a determination is made as to whether there are additional transactions executing during the selected time period at step 730. If additional transactions were executing during the selected time period at step 730, the next transaction is selected at step 735 and the method of FIG. 7 returns to step 725. If no additional transactions were executing during the selected time period, the method of FIG. 7 continues to step 740 where it is determined that all transactions executing in the selected time period are complete and the concurrency of the transactions in that selected time period are determined. Determining the concurrency of transactions in a selected time period at step 740 is discussed in more detail below with respect to FIG. 8.

After determining concurrency, a determination is made as to whether the completed transaction executes in additional time periods at step 745. Thus, steps 715-740 were performed for a particular time period. If the completed transaction was executing in additional time periods, the next time period is selected at step 750 and the method of FIG. 7 returns to step 715. If the complete transaction is not executed in any additional time periods, then the method of FIG. 7 is done at step 755 and all concurrency information has been determined for the selected time period.

Figure 8:
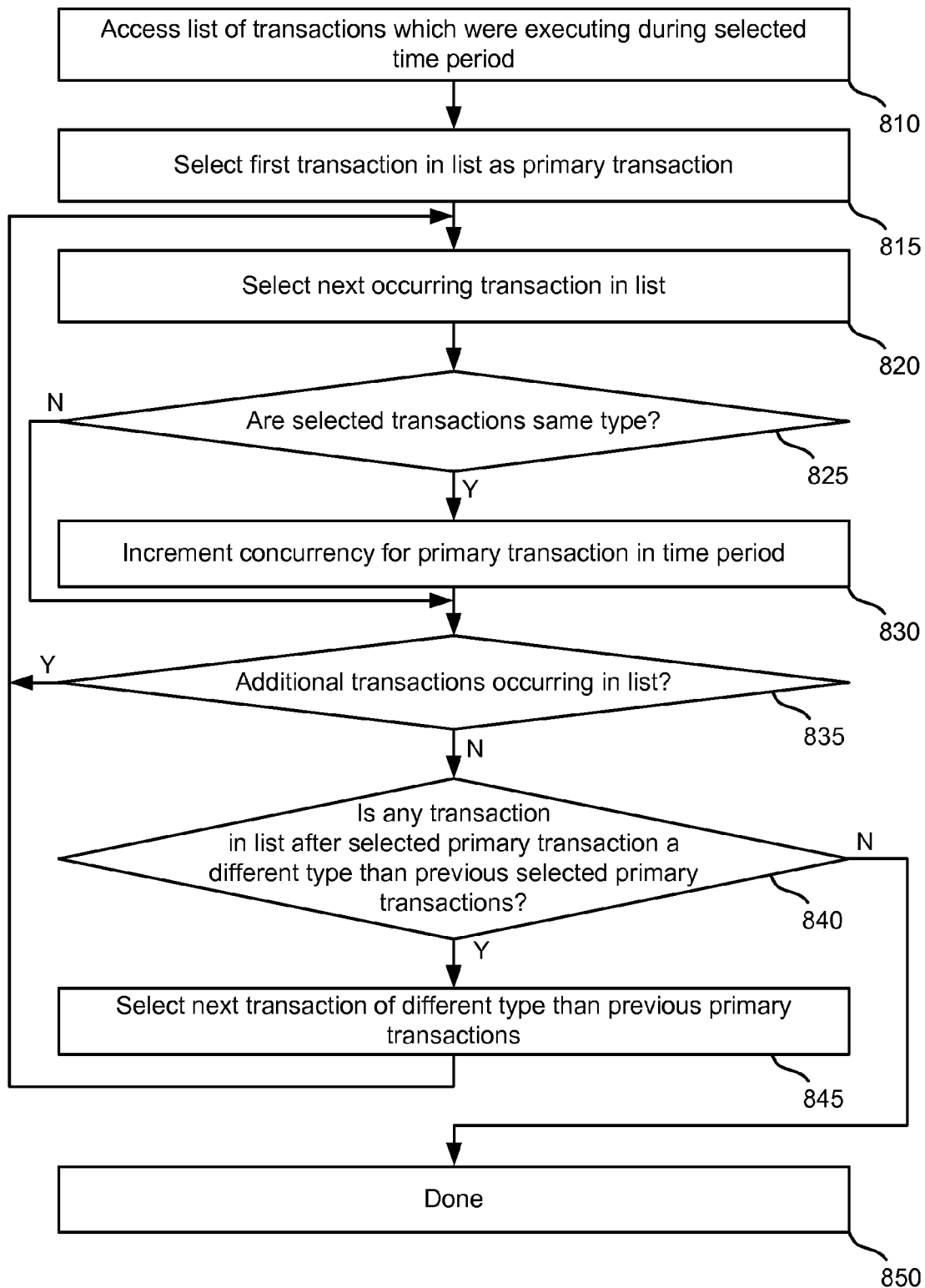
FIG. 8 is a flowchart of an embodiment of a method for determining concurrency during a selected time period.

FIG. 8 is a flowchart of an embodiment of a method for determining concurrency for business transactions. In some embodiments, the method of FIG. 8 provides more detail for step 740 of the method of FIG. 7. First, a list of transactions which were executing during the selected time period is accessed at step 810. In some embodiments, the data may be stored locally and accessed by agent 115. In some embodiments, application monitoring system 117 may access the list from a local or remote memory store.

Figure 9:
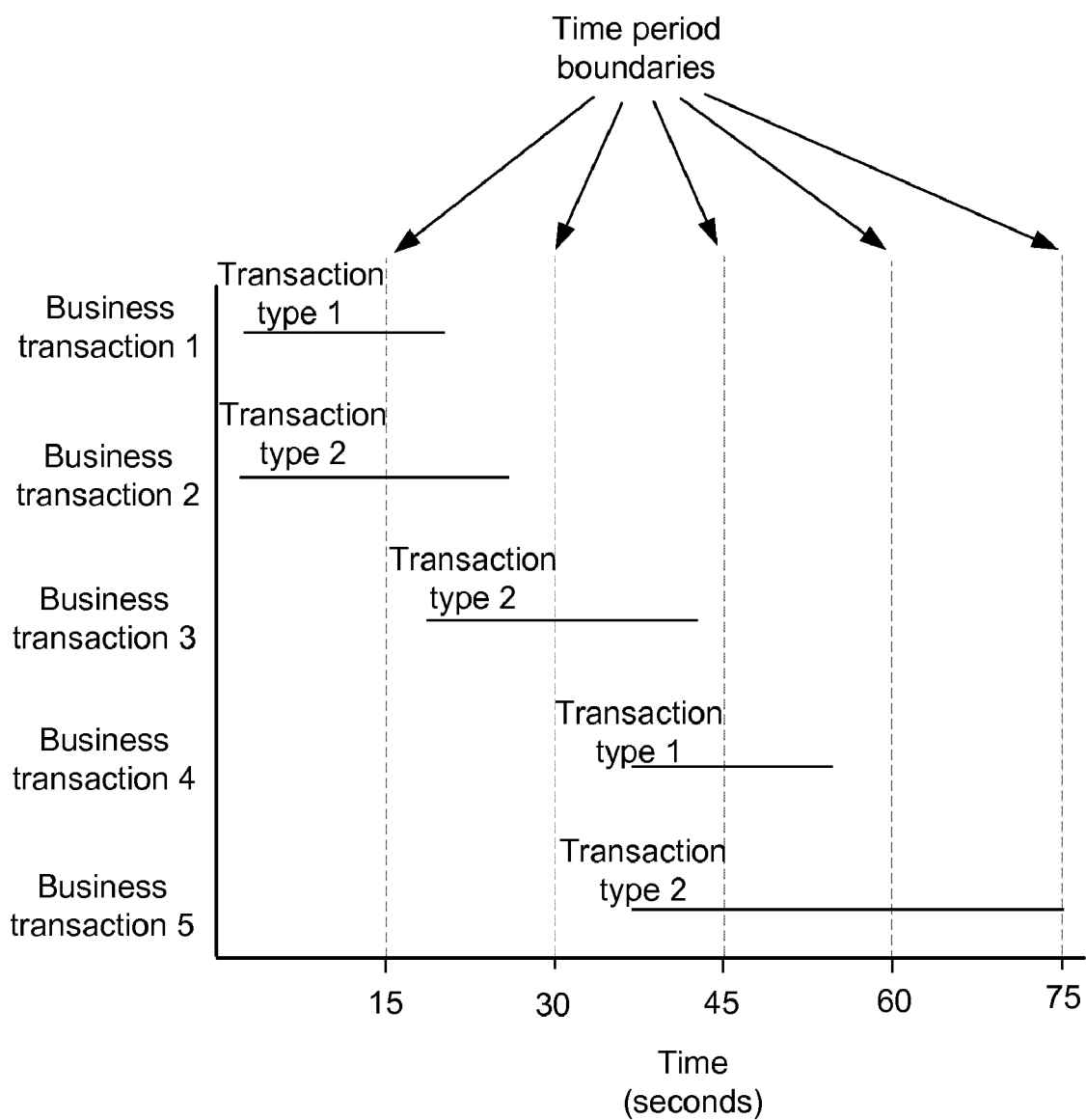
FIG. 9 is an example of a graphic illustrating the execution of business transactions over time.

Next, a first transaction in the list is selected as a primary transaction at step 815 and the next occurring transaction in the list is selected at step 820. A determination is then made as to whether the selected transactions are the same transaction type at step 825. For example, with respect to FIG. 9, business transaction 1 and business transaction 4 of FIG. 9 are both type 1 transactions. Examples of transaction types may be transactions with a same URL or a same type defined by a user (for example, a "check-out" type transaction or a "login" type transaction for an e-commerce web service). If the selected transactions are the same type, the concurrency for the primary transaction is incremented for the current time period at step 830 and the method of FIG. 8 continues to step 835. If the selected transactions are not the same type, the method of FIG. 8 continues to step 835.

A determination is made as to whether there are additional transactions occurring in the list at step 835. If there are additional transactions in the list, the method of FIG. 8 returns to step 820 where the next occurring transaction in the list is selected. If there are no additional transactions in the list, the determination is made as to whether any transactions in the list after the selected primary transaction are of a different type than the previous selected primary transactions at step 840. A determination at step 840 determines if there are any different types of transactions occurring in the time period to determine concurrency for. If there are different types of transactions in the selected time period to determine concurrency for, the next transaction of a different type than the previous primary transactions is selected at step 845 and the method of FIG. 8 returns to step 820. The first occurrence of a different transaction type is selected at step 845. If at step 840 there are no transactions in the list having a different type than the previous primary transactions, then the method of FIG. 8 is complete at step 850.

FIG. 9 is an example of a graphic illustrating the execution of business transactions over time. The graphic of Figure is used to illustrate how concurrency may be determined, in one embodiment. FIG. 9 illustrates five business transactions executing over a 75 second time line divided into 15 second time periods. Each of the five business transactions are either a type one transaction or a type two transaction. In particular, business transactions one and four are type one transactions while business transactions two, three and five are type two transactions.

The five business transactions execute for some period of time between 0 and 75 seconds, and extend over two or more 15 second time periods. The time periods end at 15, 30, 45, 60 and 75 seconds. During the first time period, business transaction 1 and business transaction 2 begin execution. During the second time period of 15-30 seconds, business transaction 1 and 2 complete execution and business transaction 3 begins execution. During the third time period, business transaction 3 ends execution and business transaction 4 and 5 begin execution. During the fourth time period, business transaction 4 ends and business transaction 5 continues execution. Business transaction 5 ends execution during the fifth time period of 60-75 seconds. When concurrency is determined as the number of transaction instances executing during a time period, transaction type 1 has a concurrency of 1 in time periods 0-15, 15-30, 30-45, and 45-60. Transaction type 2 has a concurrency of 1 in time periods 0-15, 45-60 and 60-75 and concurrency of 2 in time periods 15-30 and 30-45.

Figure 10:
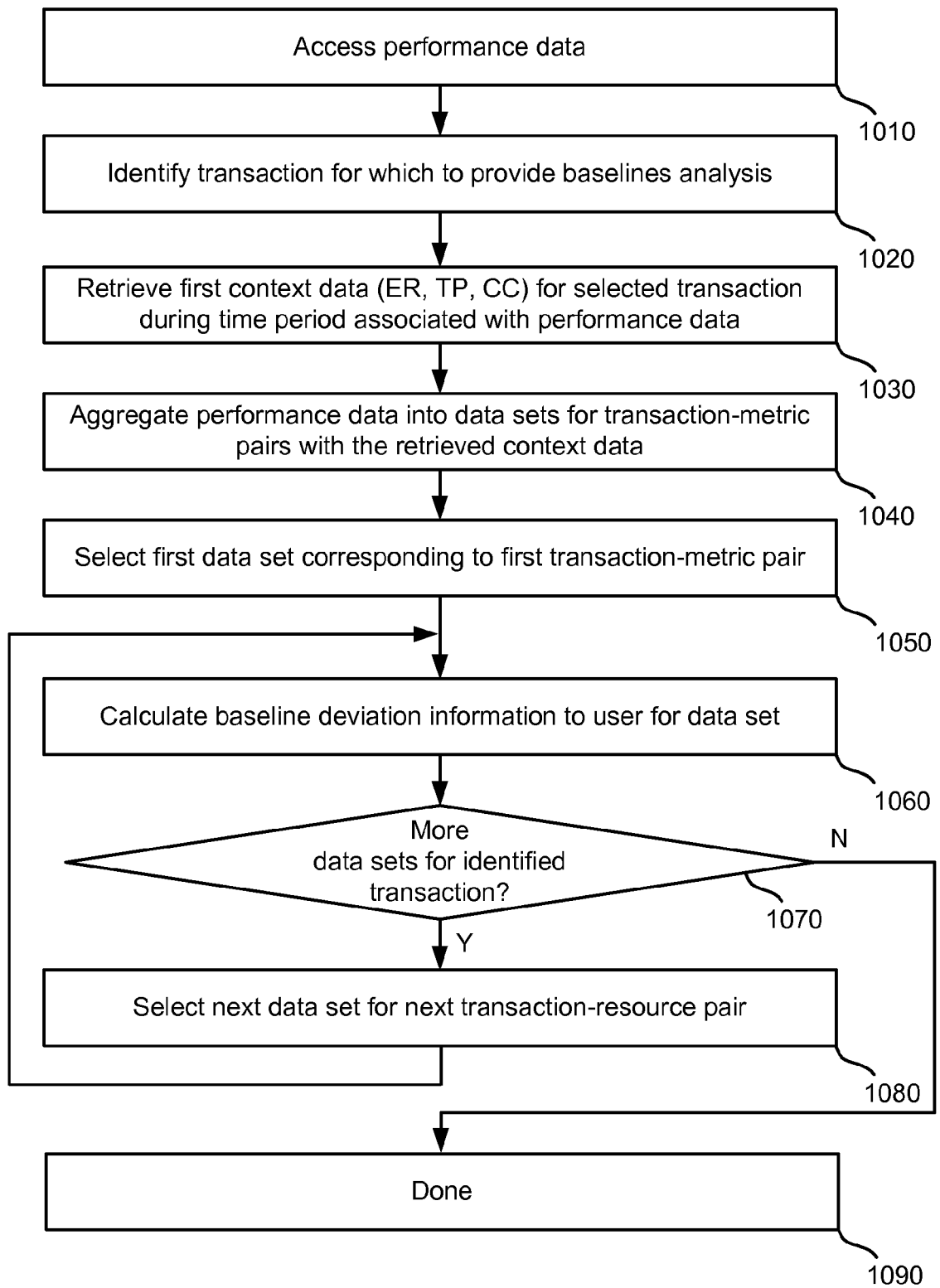
FIG. 10 is a flowchart of an embodiment of a process for calculating baseline and baseline deviation information.

FIG. 10 is a flowchart of an embodiment of a method for determining a baseline and deviation from a baseline. In some embodiments, the method of FIG. 10 provides more detail for step 370 of the method of FIG. 3. Performance data is accessed at step 1010. The performance data may be associated with data generated in the identified time period and/or additional data from previous time periods. A transaction is then selected for which to provide a baseline analysis at step 1020. The transaction may be selected automatically, for example in a sequence of selections for each transaction. In some embodiments, the transaction may be selected in response to user input requesting a particular transaction, or in response to some other event.

First context data is retrieved for the selected transaction during the identified time period at step 1030. The first context data may include error rate, throughput and concurrency data for the selected transaction during the identified time period determined at step 410. The accessed context data may be that context data stored at step 460 of the method of FIG. 4.

The accessed performance data is then aggregated at step 1040 into data sets for transaction-metric pairs associated with a context. For example, the performance data may be aggregated into a data set of one or more data points indicating the average response time for a first transaction type during the identified time period. Thus, each transaction and context, there will be a data set for each metric to be compared to a baseline.

A performance data set associated with the transaction, metric and the first context is then selected at step 1050. Baseline deviation information is then calculated for the selected transaction having the first context at step 1060. The baseline information is determined from previous performance and context data for the particular transaction. After determining the baseline, the selected transaction data is compared to the baseline and a deviation is determined based on the difference. Calculating baseline deviation information to a user for a selected transaction having a first context is discussed in more detail below with respect to FIG. 11.

Figure 11:
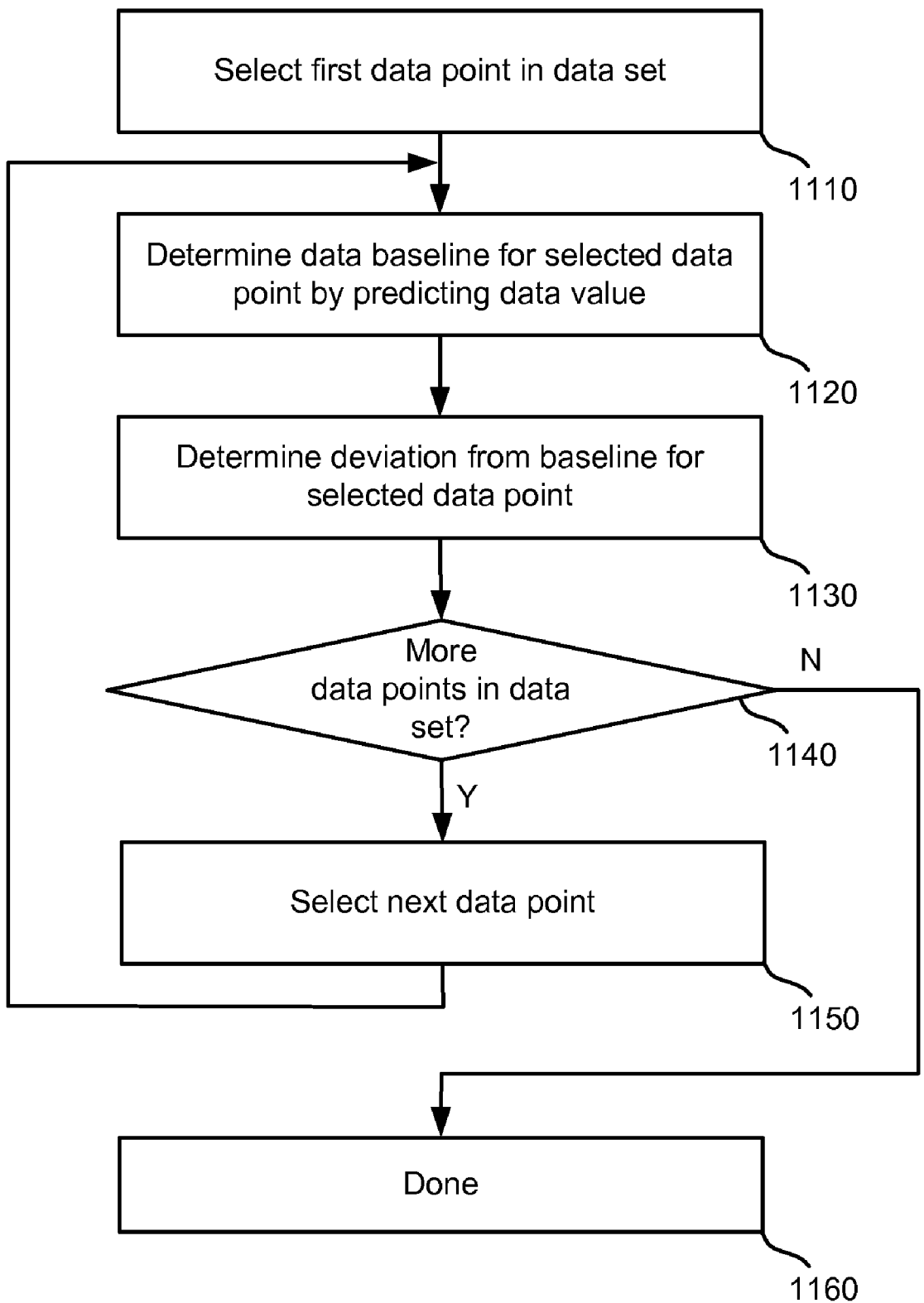
FIG. 11 is a flow chart of an embodiment of a method for calculating baseline deviation information.

FIG. 11 illustrates a flow chart of an embodiment of a method for calculating baseline deviation information. In one embodiment, the method of FIG. 11 provides more detail for step 1060 of the method of FIG. 10.

First, a first data point is selected from the selected data set at step 1110. A baseline for the selected data point is then determined by predicting the value of the data point at step 1120. In this case, the data point value is predicted based on previous data values in the current data set or a previous data set. The baseline can be determined using one or more functions applied to previous or current performance data. Determining a baseline for a selected data point by predicting a data point value is discussed in more detail below with respect to the method of FIG. 12.

The deviation of the current data point from the determined baseline is determined at step 1130. Determining the deviation includes comparing an expected baseline value for the data point to the actual value of the data point and characterizing the difference. For example, the difference may be identified within a normal range of deviation or outside the normal range of deviation. Exemplary embodiments of determining deviation from a baseline value for a selected data point are discussed in more detail below with respect to FIGS. 14-16.

Next, a determination is made as to whether additional data points exist in the data set to be processed at step 1140. If no more data points exist in the current data set, the method of FIG. 11 is done at step 1160. If more data points exist in the data set, the next data point is selected at step 1150 and the method of FIG. 11 returns to step 1120 where baseline data is determined for the currently selected data point.

Figure 12:
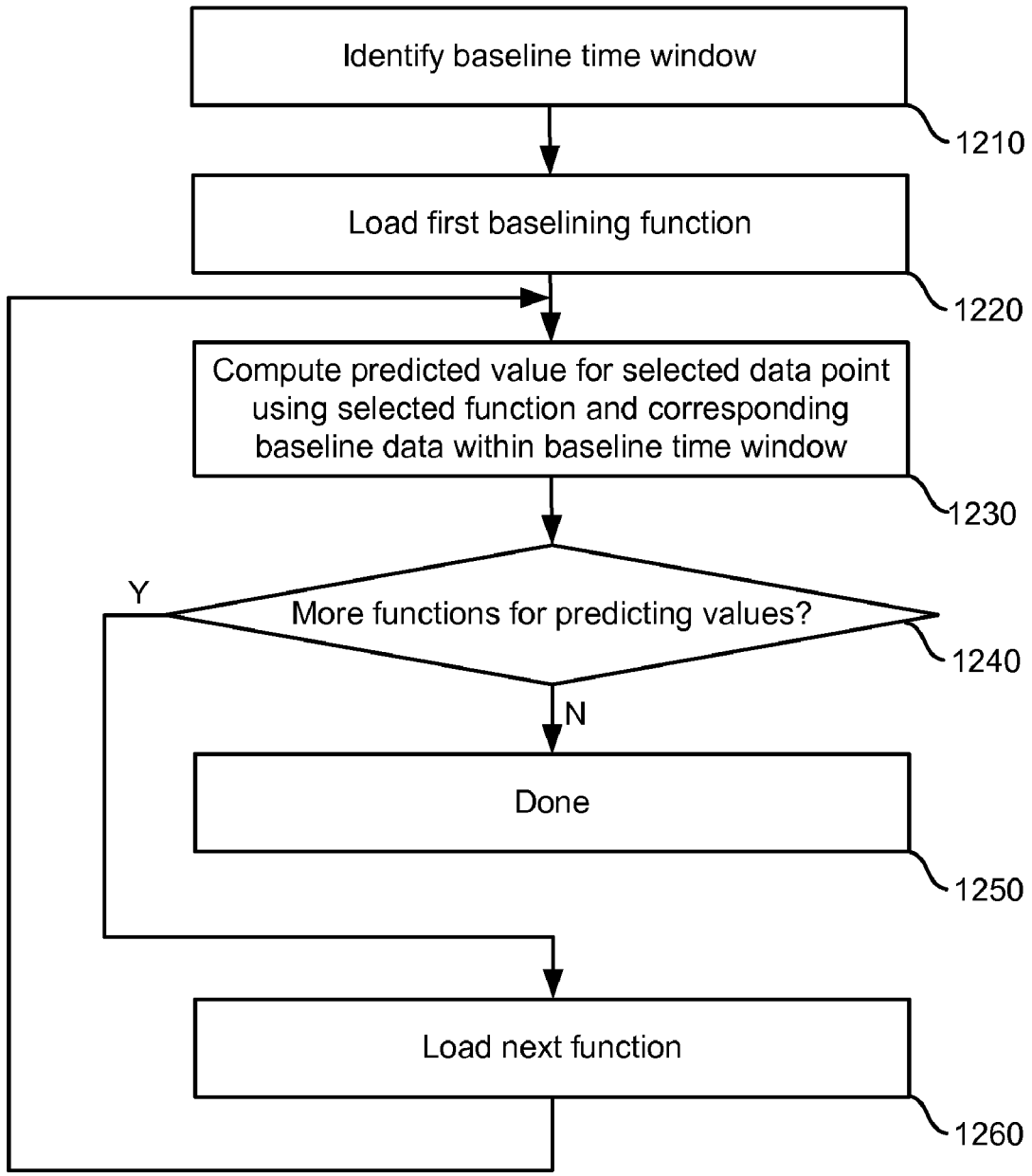
FIG. 12 is a flow chart of an embodiment of a method for determining a value for selected a data point.

FIG. 12 is a flow chart of an embodiment of a method for determining a baseline value for a selected data point value. In some embodiments, the method of FIG. 12 provides more detail for step 1130 of the method of FIG. 11. First, a baseline time window is identified at step 1210. The time window is a period of time over which data will be used to determine a baseline. The time window may be static or dynamic with respect to different baselines and may or may not include data points within a particular data set. A static time window doesn't change for calculating different baselines; it is the same period of time for all baseline calculations. For example, a static time window may be the first hour of time that an application was monitored. A dynamic time window may change based on the time of the baseline calculation, the baseline being determined or other factors. For example, a dynamic time window may be a window of thirty minutes before the baseline is determined.

A first function used to generate a baseline is loaded at step 1220. The function may be one of a set of several functions used to predict the data point value. The set of functions can include different types of functions, the same function type tuned with different constants, or a combination of these. In some embodiments, any of several functions which may be fit to a time series of data may be used to generate a baseline. In some embodiments, data set data points may be processed using two or more functions to determine a baseline. In some embodiments, once the functions are selected for the first data set, they may be used in subsequent data sets as well. In embodiments, a different set of functions may be used for different data sets, such as data sets associated with a different application or a different resource.

Several types of functions providing statistical models of an application performance data time series may be used with the present technology. Examples of statistical models suitable for use may include simple moving average, weighted moving average, single exponential smoothing, double exponential smoothing, triple exponential smoothing, exponentially weighted moving average, Holt's linear exponential smoothing, Holt-Winters forecasting technique, and others. In some embodiment, selecting one or more functions may include selecting the functions from a group of functions. For example, the five (or some other number) best fitting functions which best fit the first data set may be selected from a group of ten functions. Selecting functions and fitting functions to data, and predicting a data point is discussed in U.S. Pat. No. 7,310,590, filed on Dec. 15, 2006, entitled "Time Series Anomaly Detection using Multiple Statistical Models," having inventor Jyoti Bansal, and is hereby incorporated by reference.

After loading a first baseline function, a set of baseline data is accessed at step 1125. The baseline data is used to determine a predicted value, or baseline, to compare to the performance data of the identified time period. In some embodiments, the baseline data is previous transaction metric values recorded during a time period having the same context as that determined at step 350. As a result, the baseline is created from performance data associated with a similar environment and/or transaction performance parameters (context) as the current data, resulting in a more meaningful comparison. Accessing baseline data is discussed in more detail below with respect to FIG. 13.

A predicted value for the selected data point is computed for the selected function at step 1230. Computing the baseline value may be done using any of several functions as discussed above. For example, fitting functions to a data set may include determining function constants. The constants may be determined from the first data set and enable each function to be fit to the first data set.

After computing a baseline value for the data point using the current function, a determination is made as to whether more functions exist for predicting a baseline value at step 1240. If more functions exist for determining a baseline value, the next function is loaded at step 1260 and the method of FIG. 12 returns to step 1230 where a new baseline value is computed using the selected function. If more functions do not exist for predicting values, the method of FIG. 12 is complete at step 1250.

Figure 13:
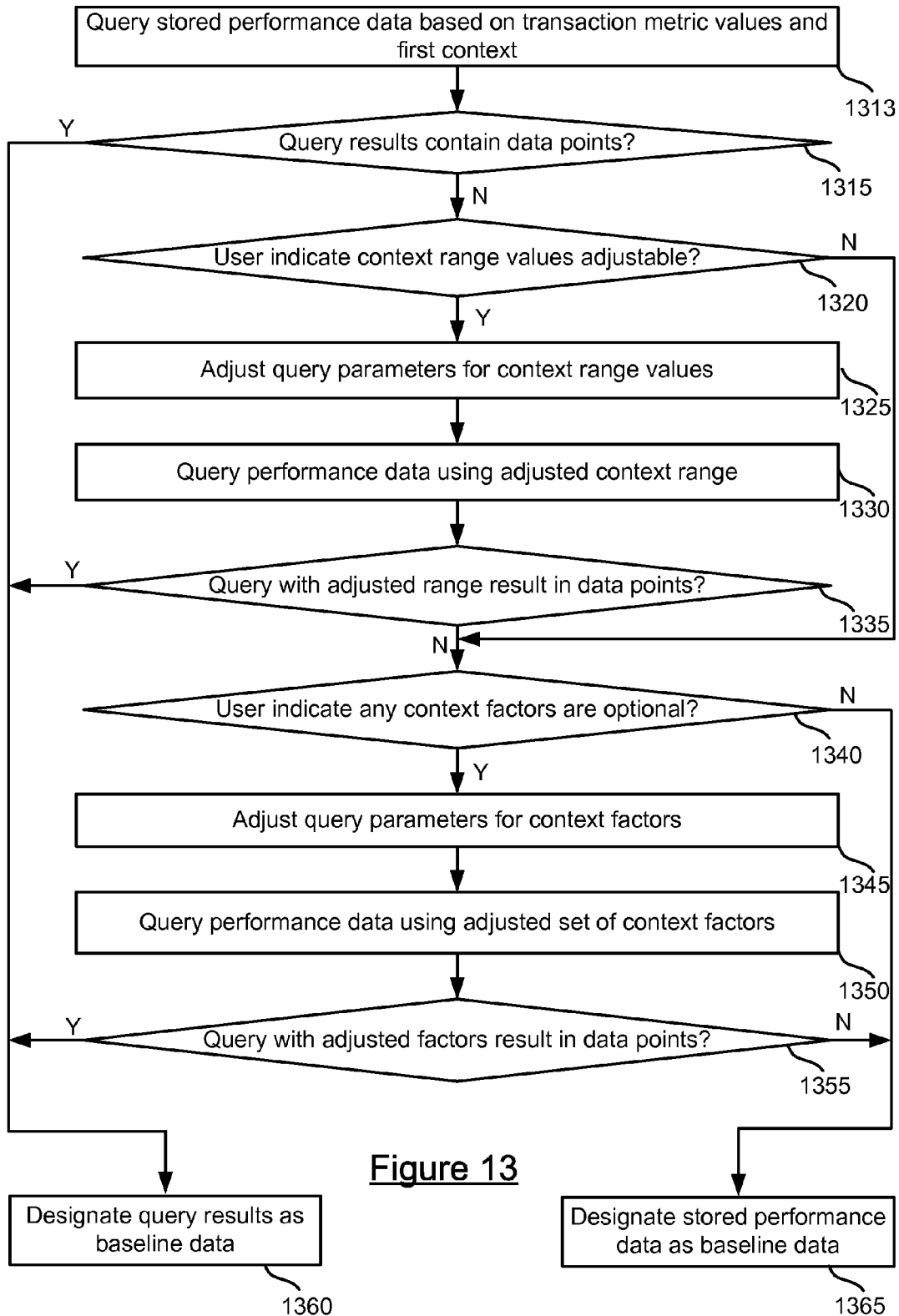
FIG. 13 is a flowchart of an embodiment of a method for identifying baseline data.

FIG. 13 is a flowchart of a method for selecting a performance data set as baseline data. In some embodiments, the method of FIG. 13 provides more detail for step 950 with the method of FIG. 9. First, a query is performed for stored performance data based on the selected transaction, metric and context at step 13 10. The query may be performed by application monitoring system 117, agent 208, or some other module. The purpose of the query is to obtain a time series of data for a transaction metric generated during a time period with the same context as the data subject to the baseline.

A determination is then made as to whether the results of the query contain data points at step 1315. The query for the performance data matching the selected transaction, metric and context may or may not result in positive results. If the query results do contain data points, then the query results are designated as baseline data at step 1360.

In some embodiments, a user may indicate that a context for baseline data does not have to be an exact match to the context of the data being analyzed. For example, a range of a particular context parameter may be within a certain percentage or neighboring range, or a particular context parameter may be ignored. Thus, a throughput context parameter may be low for data being analyzed, but a user may indicate that a throughput context parameter may be low or medium to be considered as baseline data.

If the query results do not contain data points that match the initial query, a determination is made as to whether the user has indicated that a context parameter values is adjustable at step 1320. As indicated above, a user may indicate that a context parameter value match may match, for example, more than one range in order to make the context comparison system more flexible. If the user has not indicated that the context parameter values are adjustable, the method of FIG. 13 continues to step 1340. If a user has indicated that context parameter values are adjustable, query parameters are adjusted for the context parameter values at step 1325. For example, if context parameter values may be adjustable up to plus or minus 15%, a query parameter may be adjusted based on that percent difference. Thus, if an error rate range was previously between 10% and 20%, and a user indicated that a parameter value was flexible within 20%, then the query parameters may be adjusted to search for performance data for a data set matching the selected transaction and having an error rate context of between 8 and 22%. Additionally, a user may indicate that a particular context parameter may be matched by either the exact range or immediately neighboring range.

The performance data is queried using the adjusted parameter range values at step 1330. A determination is then made as to whether the query with the adjusted parameter values resulted in any data points at step 1335. If the query with the adjusted parameter values did result in data points, then the method of FIG. 13 continues to step 1360 where the query results are designated as a selected data set. If the query with the adjusted parameter values did not result in any data points, then the method of FIG. 13 continues to step 1340.

A determination is made as to whether a user has indicated any context parameters are optional at step 1340. For example, a user may indicate that a context parameter of throughput, error rate or concurrency, or two or more of these factors may be considered optional and does not need to match a currently selected transaction and context. If the user has not indicated that any context parameter are optional, then there is no matching set of performance data for the selected transaction and context and the current transaction data is designated as baseline data at step 1365. In this case, no data is available and as a result, the current performance data is the only performance data associated with this particular transaction, metric and context. If a user has indicated that any context parameter are optional at step 1340, query parameters are adjusted for the optional context parameter at step 1345 and performance data is queried using the adjusted set of context parameter at step 1350.

A determination is then made as to whether the query with the adjusted context parameter results in one or more data points at step 1355. If the query does not result in any data points, then there is no match of the performance data for the current transaction and context and the current performance data is designated as a data set at step 1365. If the query does result in data points, there is no matching performance data and the current transaction performance data is designated as baseline data step 1360.

Figure 14:
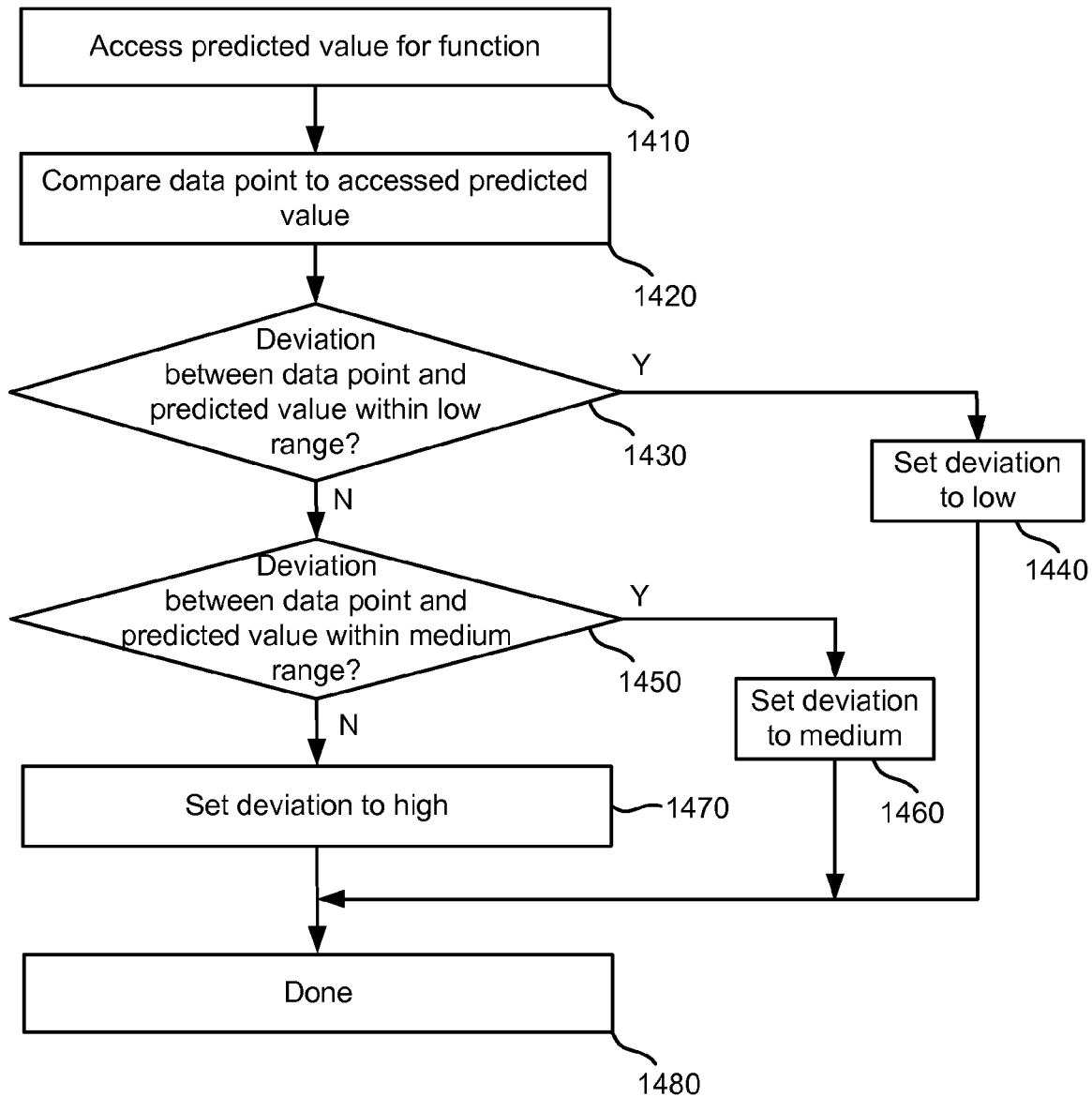
FIG. 14 is a flow chart of an embodiment of a method for determining deviation level for data point.
Figure 15:
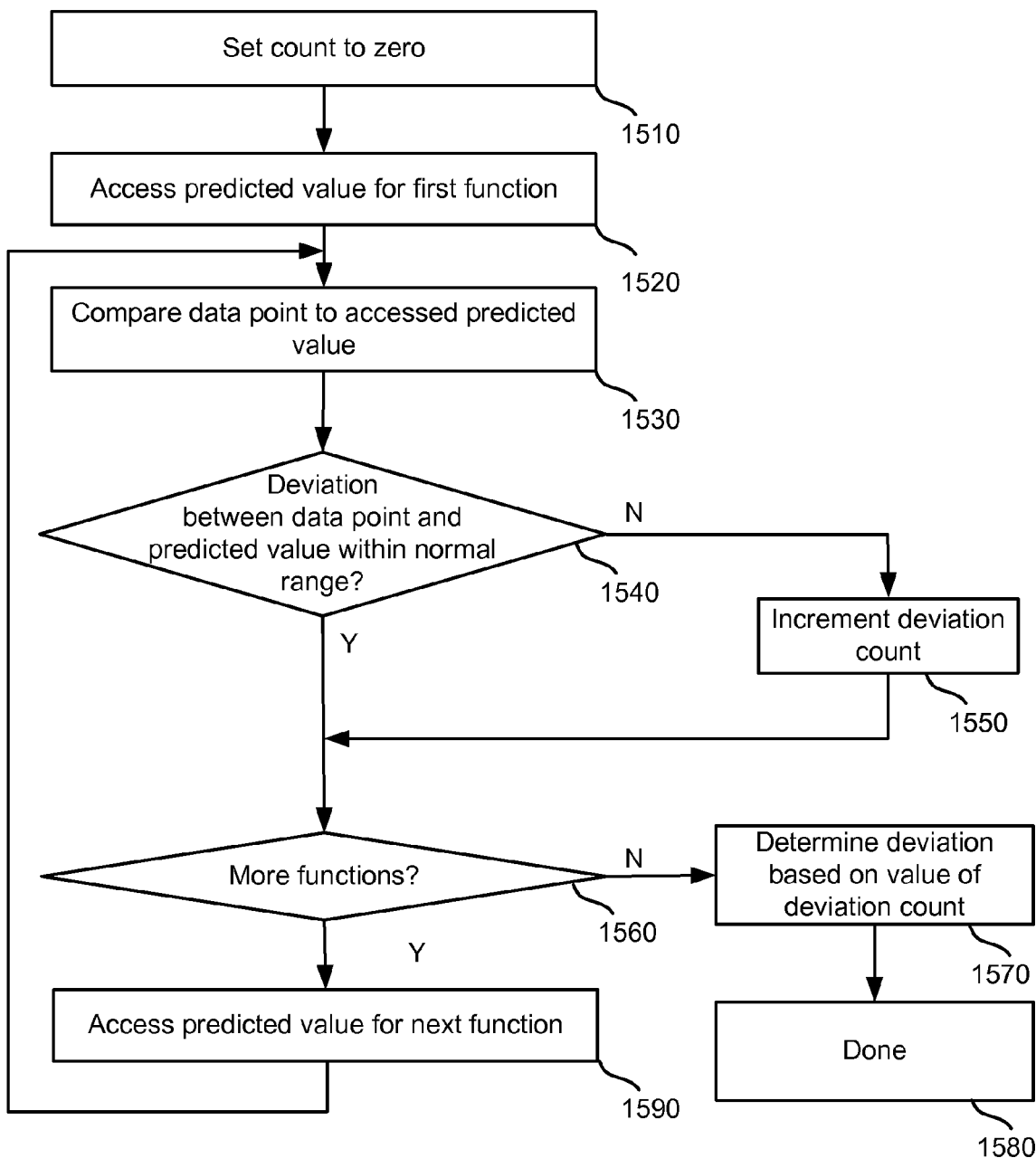
FIG. 15 is a flow chart of an embodiment of a method for determining deviation count for data point.
Figure 16:
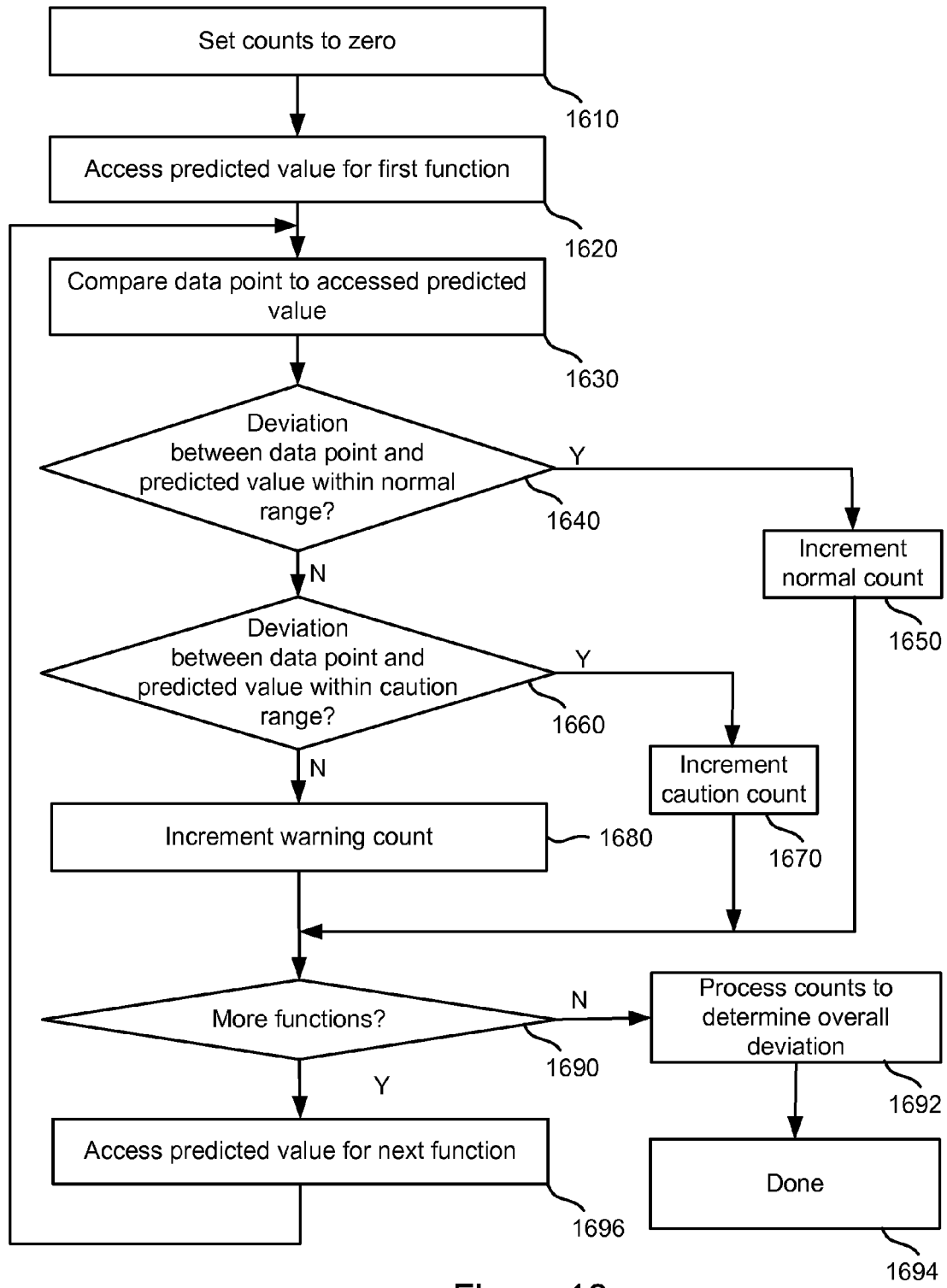
FIG. 16 is a flow chart of an embodiment of a method for determining deviation notification for data point.

FIGS. 14-16 illustrate different embodiments for determining deviation information for a data point. In one embodiment, the processes of FIGS. 14-16 each provide an example of more detail for step 1130 of FIG. 11. The different embodiments may determine deviation information using a different number of functions, use different methods for selecting a deviation range, and differ in other ways. These illustrated embodiments are intended as examples of possible implementations and other embodiments for determining deviation information are within the scope of the present technology.

FIG. 14 is a flow chart of an embodiment of a method for determining deviation level for a data point. The embodiment described by the method of FIG. 14 uses one function to determine the deviation of an actual data point from an expected data point and provides more detail for an embodiment of step 1130 of the method of FIG. 11.

First, a predicted value for a function is accessed for the next data point at step 1410. The predicted value is the baseline value determined at step 1240 in the method of FIG. 12. Next, the actual data point value is compared to the accessed value at step 1420. A determination is then made as to whether the difference between the actual data point value and the predicted data point value is within a low deviation range at step 1430. In one embodiment, a low deviation range has a small deviation, if any. The low range may be configured as up to 10% deviation of the predicted value, a standard deviation from the data points in the data series, or some other range selected by a user. In some embodiments, the range may be determined automatically by the system herein. If the data point difference is within the low deviation range at step 1430, the deviation is set to low at step 1440 and the method of FIG. 14 ends at step 1480.

If the deviation is not within the low range of deviation, a determination is made as to whether the difference between the actual data point value and the predicted data point value is within a medium range at step 1450. A medium range may be configured as between 10% and 20% deviation of the predicted value, between the standard deviation and twice the standard deviation, or some other range of values. If the deviation is within a medium range, the deviation for the data point is set to medium at step 1460 and the method of FIG. 14 ends at step 1480. If the deviation is not within the medium range at step 1450, the deviation is shut to a high range at step 1470 the method of FIG. 14 ends.

FIG. 15 illustrates a flow chart of an embodiment of a method for determining deviation count for data point. In one embodiment, the method of FIG. 15 provides more detail for step 1130 of the method of FIG. 11. First, a count is set to zero at step 15 10. In some embodiments, the count represents a number of times that a data point value falls outside the low deviation threshold associated with each predicted data point value. A predicted value of a data point associated with a first function is accessed at step 1520. Next, the actual data point value is compared to the accessed data point value at step 1530. The accessed data point value is the baseline value calculated in the method of FIG. 12.

A determination is made as to whether the deviation between the actual data point value and the predicted data point value is within a threshold at step 1540. In one embodiment, the threshold may be the limit of a low deviation range, such as 10% of the predicted value, a standard deviation, or some other value. If the deviation is not within the threshold, the count is incremented at step 1550. After incrementing the count, the process continues to step 1560. If the deviation is within the threshold, the method of FIG. 15 continues to step 1560.

A determination is made as to whether more functions are used to predict the current data point at step 1560. If more functions exist, a data point value predicted by the next function is accessed at step 1590. The method of FIG. 15 then returns to step 1530 where the actual data point value is compared to the predicted data point value for the next function. If no more functions exist which were used to predict a data point value for the current data point, the deviation is determined based on the value of the deviation count at step 1570. In some embodiments, a count of 20-50% of the number of functions used to predict the data point may indicate a medium range of deviation. A count having a value of 50% or more of the number of functions used to predict the data point may indicate that the deviation is within a high deviation range. For example, if six functions were used to predict a data point value and the actual data point value is outside the threshold for two of the six predicted values, this corresponds to 110% and a medium deviation range. If the actual data value is outside the threshold for four of the six predicted data values, the deviation range associated with the actual data point would be a high deviation range. The method of FIG. 15 is then complete at step 1580.

FIG. 16 illustrates a flow chart of an embodiment of a method for determining deviation notification for a data point. In one embodiment, the method of FIG. 16 provides more detail for step 1140 for the method of FIG. 11. First, two or more counts are set to zero at step 1610. In the embodiment of FIG. 16, a count is used for each of a low deviation range, medium deviation range and high deviation range. The counts are used to keep track of the number of actual data point values that differ by the corresponding deviation (low, medium, high) from their predicted data point value. A predicted value for a first function is accessed at step 1620. The predicted data point value is the value predicted by the method of FIG. 13. Next, the actual data point value is compared to the accessed value associated at step 1630.

A determination is made as to whether the difference between the actual data point value and the predicted data point value are within a low deviation range at step 1640. The low deviation range may be configured as ten percent of the predicted value, a standard deviation from the predicted value, or in some other manner. If the deviation is within a low deviation range at step 1640, a low count is incremented at step 1650 and the method of FIG. 16 continues to step 1690. If the deviation is not within the low range, a determination is made as to whether the deviation between the actual data point value and predicted data point value is within a medium deviation range at step 1660. If the deviation is within the medium range, a medium count is incremented at step 1670 and the method of FIG. 16 continues to step 1690. If the deviation is not within the medium range at step 1660, the data point value is in a high deviation range, a high count is incremented at step 1680 and the method of FIG. 16 continues to step 1690.

A determination is then made as to whether more functions were used to predict data points for the actual data point at step 1690. If more functions were used, a predicted value generated by the next function is accessed at step 1696. The method of FIG. 16 then returns to step 1630 where the accessed predicted data point value is compared to the actual data point value.

If no more functions were used to predict values for the current data point, the counts are processed to determine the overall deviation at step 1692. In some embodiments, the count (of the low, medium and high count) which has the largest value is selected as the corresponding range associated with the data point. Thus, if the low count has a value of one, the medium count has a value of three, and the high count has a value of one, the current data point will be associated with a medium deviation range. The method of FIG. 16 is then complete at step 1694.

In some embodiments, a count may be incremented by a value greater than one in the embodiments of FIGS. 15-16 or other embodiments that use counts. A process may be used to weight the increment value when a particular function is trusted or more closely resembles a time series than other functions used to predict values of the time series. For example, if a function appears to represent a time series with a low deviation for a certain period of time, the increment value for the function may be weighted to increment a counter more than normal if the actual data point value differs from the predicted data point value. In some embodiments, the increment associated with a function may be weighted if the difference calculated between the last hundred (or some other number) actual data points and the data points predicted by a function has been less than a threshold value. Thus, a determination may identify whether the function has a history of accurately predicting values for the times series.

A time series may experience an increase or decrease in values over time that may not be due to application or resource heath. For example, in some embodiments, different functions can be used to analyze a time series for different periods of time. For example, an application which generates a time series may experience more activity (for example, receive more traffic) during business hours, or more activity on weekdays then weekends. The change from a recognized busy period to a less busy period (e.g, Friday to Saturday, or 5 p.m. to 6 p.m.) may cause a change in the time series data which could be mistaken as an anomaly. In this case, the change would be due to a change in application activity level, not due to an anomaly caused by degraded application health or performance. Thus, the anomaly detection system may be configured to utilize different functions at activity periods or to adjust the functions to better approximate the changed time series as the application activity changes. This "normalization" of the system may be used to reduce false alarms that may appear as a deviation of concern but are actually just a reflection of expected increased activity or load on an application or the particular resource.

Figure 17:
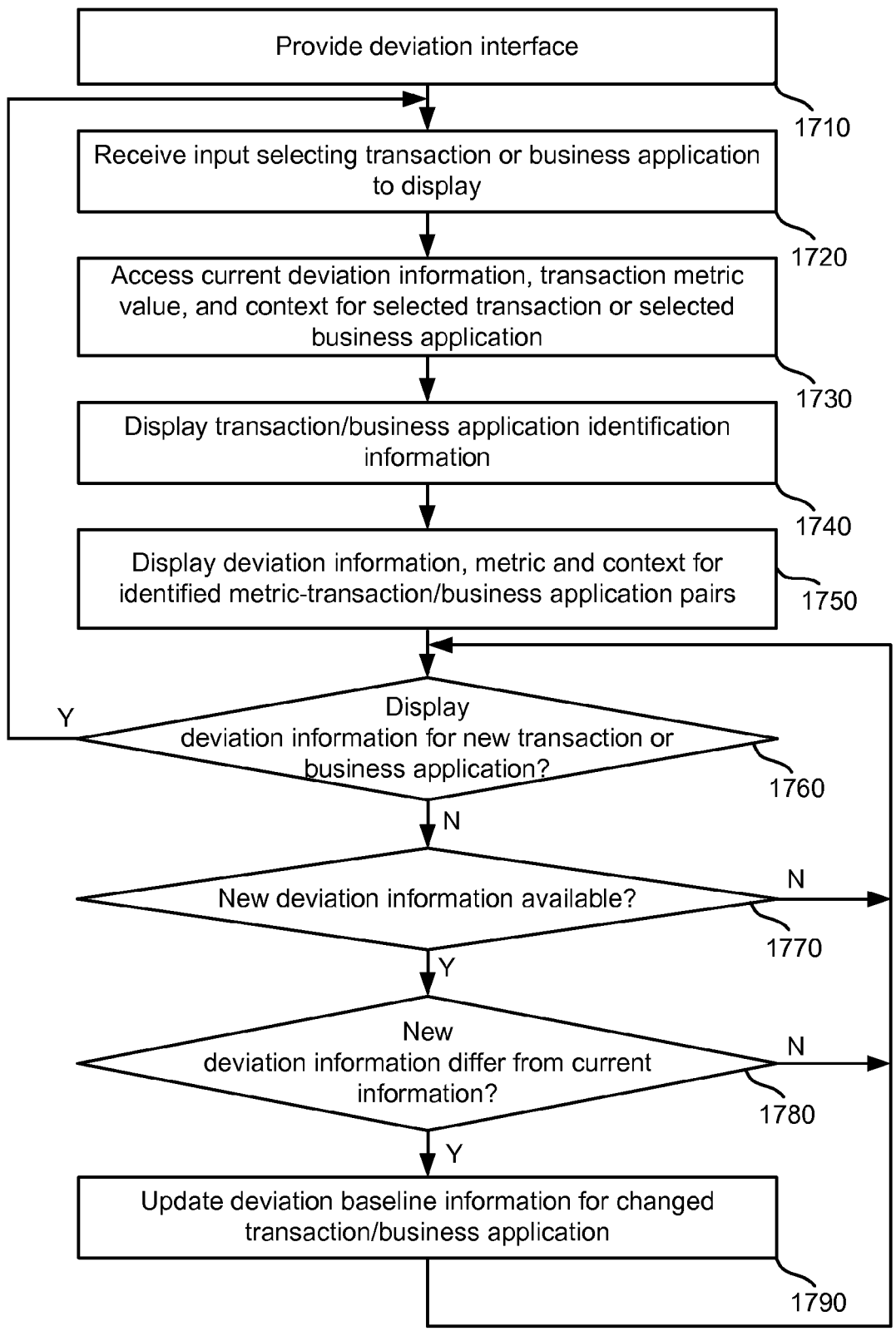
FIG. 17 is a flow chart of an embodiment of a method for reporting baseline deviation information.
Figure 18:
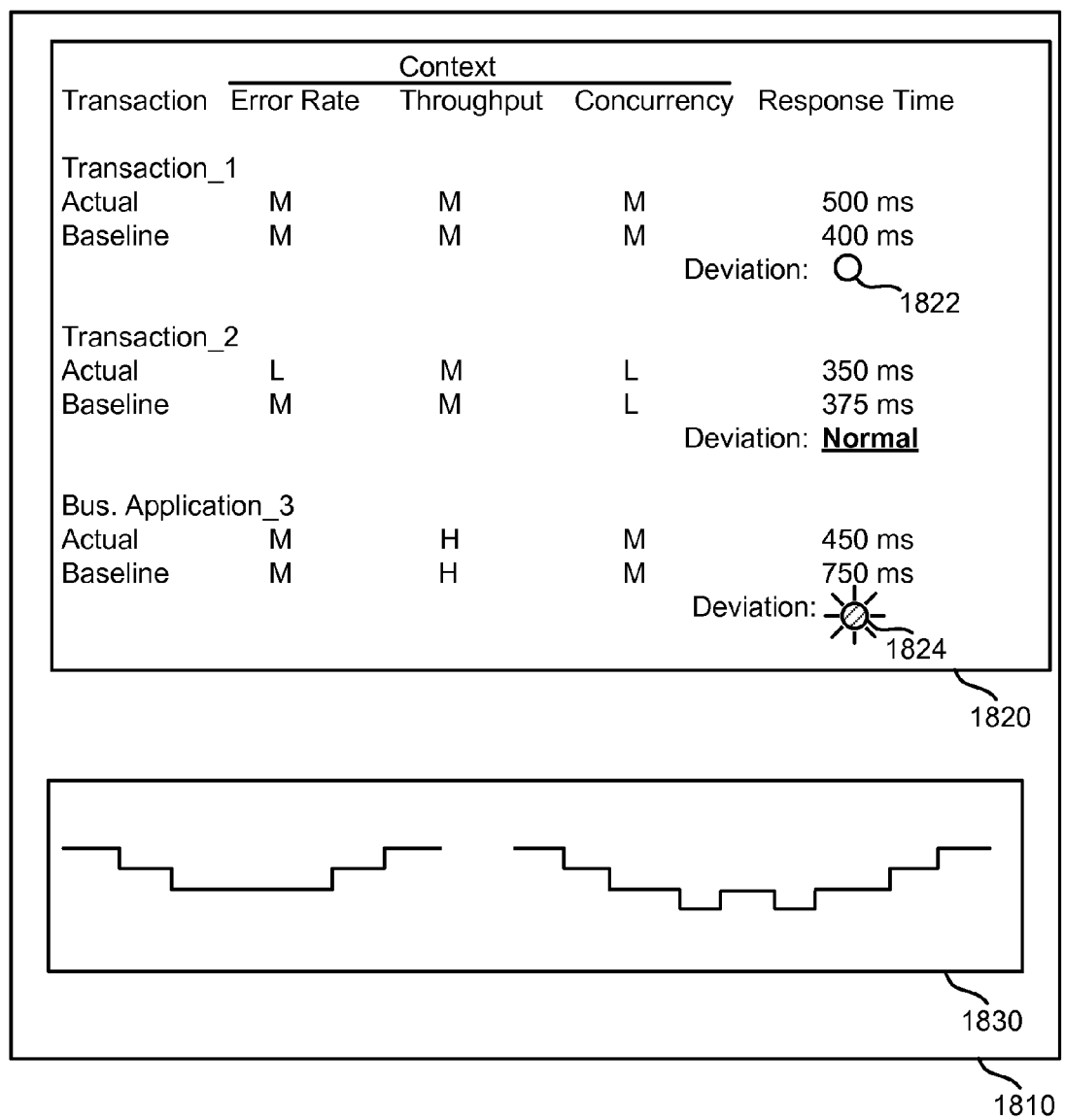
FIG. 18 is a block diagram of an interface for providing baseline deviation information with context information for one or more transactions.

FIG. 17 is a flow chart of an embodiment of a method for providing baseline deviation information to a user. Baseline deviation information may be provided to a user through an interface provided by work stations 224 or 226 of FIG. 2B or some other hardware and/or software. In one embodiment, the method of FIG. 17 provides more detail for step 380 of the method of FIG. 3. The flowchart of FIG. 17 describes one method of several possible methods for providing an interface, and is intended as an example only; several types of interfaces may be used to provide deviation information with a particular context. An example of an interface which provides deviation information is illustrated in FIG. 18 and referenced throughout the discussion of the method of FIG. 17.

First, a deviation interface is provided at step 1710. The deviation interface may provide deviation information to a user for one or more selected transactions or business applications. Input selecting a transaction or business application to display in the interface is received at step 1720. The input may select a transaction from a list of transactions, allow a user to define a business application as a set of transactions, or otherwise determine a transaction or business application.

Information to display for the selected transaction or business application is accessed at step 1730. The accessed information may include deviation information, transaction metric value, context values for the selected transaction (or business application) and optionally other information. The information may be accessed from Enterprise Manager 220, database 222 or some other source.

Transaction or business application identification information is provided in the deviation interface at step 1740. The identifications may include the name, a nickname, or some other identifier for the transaction. In the interface of FIG. 18, transaction identifiers "Transaction_1" and "Transaction_2" are displayed. A business Application "Bus. Application_3" is also illustrated.

The deviation information, metric and context are displayed in the interface for each identified transaction or business application at step 1750. In some embodiments, only the deviation information is initially displayed, and the corresponding context information is provided upon a request received from a user. A "Normal" level indicates that the deviation is within an acceptable range, the "warning" level indicates that the deviation is not within an acceptable range but may not be cause for concern, and the "alert" level indicates that the deviation is not within an acceptable range and that performance with respect to the metric is very poor. In the interface of FIG. 18, deviation information for Transaction_2 is displayed as "Normal," deviation information for Transaction_1 is a graphic indicator 1722 associated with "Normal", and deviation information for Transaction_3 is a graphic indicator 1724 associated with "Alert."

A determination is made as to whether deviation information should be displayed for a new transaction or business application at step 1760. The determination may be triggered by receiving a request from a user to display information from a new transaction or detecting some other event. If a new transaction or business application should be displayed, the method returns to step 1720 where input selecting the transaction or business application to display is received. If a new transaction or business application is not to be displayed, a determination is made as to whether new deviation information is available at step 1770. New deviation information may be available as an application is monitored and new performance data becomes available. The new information may be pushed to a workstation displaying the interface or pulled by the workstation from enterprise manager 220 or database 222. If new deviation information is available, the method of FIG. 17 continues to step 1780. If no new information is available, the method returns to step 1760.

A determination is made as to whether new deviation information differs from the currently displayed information at step 1780. If either the new deviation information differs from the currently displayed information, the interface is updated with the new deviation, context, and/or baseline information for the changed transaction and/or resource-business application at step 1790. Updating the interface may include accessing the updated information and populating the interface with the updated information. The method of FIG. 17 then returns to steps 1760.

FIG. 18 is an example of a user interface 1810 for providing deviation information for a particular context to a user. User interface 1810 includes deviation information window 1820 and graphical data window 1830. Deviation information window 1820 includes information such as identifiers of transactions and business applications, metric information, context data, baseline data for a transaction and/or business application, and baseline deviation information. The deviation information may be text, graphical, or some other format as illustrated and discussed above.

There are three transactions listed in deviation information window 1820: transaction_1, transaction_2 and business application_3. For each transaction, an actual and baseline value is provided for the transaction context and metric value. The response time metric is indicated in milliseconds and the context includes parameters of error rate, throughput and concurrency. Each parameter may have a level of low (L), medium (M) or high (H).

For example, transaction_1 has actual context of medium range error rate, medium range throughput and medium range concurrency and an actual response time of 500 milliseconds. The baseline information for transaction_1 includes a medium range error rate, medium range throughput, medium range concurrency, and a baseline response time of 400 milliseconds. A deviation for the metric is indicated with a graphical icon 1822, representing a normal level of deviation.

Below the first transaction information is information for transaction_2, which has actual context parameters of low error rate, medium throughput and low concurrency. The baseline context for transaction_2 is a medium error rate, medium throughput and low concurrency. As illustrated, the error rate parameters are not an exact match between the actual and baseline values for transaction_2. In this case, a user has indicated that a baseline error rate may differ by a one level of the actual error rate context. Thus, an error rate of medium is determined to be close enough to the low error rate actually experienced by transaction_2. Transaction_2 has an actual response time of 350 milliseconds while the baseline response time of 375 seconds. The deviation between these two is illustrated in text as the word "normal."

Business application_3 has actual context information of a medium error rate, high throughput and medium concurrency and a baseline context of medium error rate, high throughput, and medium concurrency. The transaction has an actual response time of 450 milliseconds and baseline response time of 750 milliseconds. A flashing graphical icon 1822 is provided to bring alert to this level deviation. As should be understood, assigning a deviation level to the difference between an actual metric value and baseline metric value may be configured by a user based on preference, system design or other factors.

It should be noted that the deviation levels, icons, format, actual metric values and baseline metric values illustrated in FIG. 18 are all examples of possibilities that may be implemented in a deviation interface. In some embodiments, the format, icons and other display data may be configured by a user or automatically. The present technology is not intended to be limited by the particular example icons, data, format and other characteristics in the interface of FIG. 18.

Graphical data window 1830 may provide information for a particular transaction or business application in graphical form. The data may indicate relationships between components that perform a transaction, as well as the relationships of the transactions themselves, if any. Additional windows and other information may also be provided in user interface 1810 to provide more information for the resources used, usage and baseline data, the components, transactions and business applications, or other data.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A computer implemented method for monitoring a transaction, comprising:

accessing performance data generated from monitoring an application and associated with a transaction type, transactions associated with the transaction type performed to process requests transmitted to the application;

determining a first context for a portion of the performance data associated with the transaction type, the first context for each portion of performance data associated with a selected time period during which the transactions associated with the transaction type were performed, the first context including one or more parameters each having a parameter value that falls into one of a plurality of ranges;

predicting a performance value for the accessed performance data using prior performance data, the prior performance data associated with the same transaction type and having a second context for the transaction type, the second context including the one or more parameters each having a parameter value that falls into one of the plurality of ranges, each of the one or more parameters for the second context falling into the same range as the corresponding parameter for the first context, the second context associated with a previous time period than the time period associated with the first context;

identifying a deviation between the accessed performance data and the predicted performance values for the performance data;

reporting baseline deviation information derived from the deviation.

2. The computer implemented method of claim 1, wherein the performance data includes response time data for each of the one or more transactions.

3. The computer implemented method of claim 1, wherein the performance data includes data for each transaction for the selected time period.

4. The computer implemented method of claim 1, wherein the first and second context each include two or more parameters.

5. The computer implemented method of claim 1, wherein the context parameters include two or more of error rate, concurrency and throughput.

6. The computer implemented method of claim 1, wherein the plurality of ranges include a high range, a medium range and a low range.

7. The computer implemented method of claim 1, wherein said step of predicting a value includes:

fitting one or more functions to the prior performance data; and calculating a value for accessed performance data using the fitted one or more functions.

8. One or more processor readable storage devices having processor readable code embodied on said processor readable storage devices, said processor readable code for programming one or more processors to perform a method comprising:

generating performance data for transactions performed by an application being monitored;

determining a first context for the transactions, the first context associated with a first time period, the first context includes one or more parameters each having a parameter value that falls into one of a plurality of ranges;

predicting a performance value for the performance data using prior performance data, the prior performance data associated with a second context that includes the one or more parameters each having a parameter value that falls into one of the plurality of ranges, each of the one or more parameters for the second context falling into the same range as the corresponding parameter for the first context, the second context associated with a previous time period than the time period associated with the first context;

comparing the generated performance data to the predicted performance values for the performance data;

providing health information for the transactions, the health information based on said step of comparing.

9. The one or more processor readable storage devices of claim 8, wherein the performance data is generated in response to monitoring an application by code inserted into the application.

10. The one or more processor readable storage devices of claim 8, wherein said step of generating performance data includes:

inserting monitoring code into the application by bytecode instrumentation; and generating the performance data using the monitoring code.

11. The one or more processor readable storage devices of claim 8, wherein said step of generating performance data includes:

monitoring the application while the application is performing the transactions; and generating the performance data in response to monitoring the application.

12. The one or more processor readable storage devices of claim 8, wherein the context parameters for the transactions includes at least one of error rate, concurrency and throughput.

13. The one or more processor readable storage devices of claim 8, wherein said step of predicting includes:

identifying a time window associated with a period of time occurring before the first time period;

selecting a set of performance data generated during the time window and for which each of the one or more parameters falls into the same range as the corresponding parameter for the first context; and computing a predicted value for a first data point using a selected function and the selected set of performance data generated during the time window.

14. The one or more processor readable storage devices of claim 8, wherein the health information indicates one of two or more levels of health for the transactions performed by the application.

15. The one or more processor readable storage devices of claim 8, wherein said method further comprises reporting an alert if the health information for one or more transactions is abnormal.

16. A computer implemented method for monitoring an application, comprising:

creating performance data for two or more transaction types performed by an application;

determining a first context associated with each of the two or more transaction types for a period of time, the first context includes one or more parameters each having a parameter value that falls into one of a plurality of ranges;

predicting a performance value for the performance data associated with a first transaction type of the two or more transaction types and the first context, the performance value predicted using data associated with a second context that includes the one or more parameters each having a parameter value that falls into one of the plurality of ranges, each of the one or more parameters for the second context falling into the same range as the corresponding parameter for the first context, the second context associated with a previous time period than the time period associated with the first context;

determining baseline deviation information for the performance data based on the predicted values and the created performance data associated with the first context; and reporting the baseline deviation information to a user.

17. The computer implemented method of claim 16, wherein the performance data is generated from data reported by code inserted into an application.

18. The computer implemented method of claim 16, wherein a context for a first transaction occurring during the period of time is different than the context for a second transaction occurring during the same period of time.

19. The computer implemented method of claim 16, wherein the one or more parameters include error rate, concurrency, and throughput, each parameter having a value that falls into a range of low, medium or high.

20. The computer implemented method of claim 16, wherein said step of predicting a value for the performance data includes:

accessing a set of performance data associated with a first transaction type of the two or more transaction types;

fitting the set of accessed performance data to one or more functions; and predicting a value for the created performance data using the one or more fitted functions.

21. An apparatus for processing data, comprising:

a communication interface;

a storage device; and one or more processors in communication with said storage device, and said communication interface, said one or more processors perform transactions, determine a first context for each of the transactions, determine baseline deviation information for the transactions, and report the baseline deviation information, the first context associated with a transaction and a first time period, the first context includes one or more parameters each having a parameter value that falls into one of a plurality of ranges, the baseline deviation information indicating whether an actual value for performance data generated in response to monitoring the transactions differs from a predicted value for the performance data, the predicted values are based on performance data for transactions that have a second context that includes the one or more parameters each having a parameter value that falls into one of the plurality of ranges, each of the one or more parameters for the second context falling into the same range as the corresponding parameter for the first context, the second context associated with a time period prior to the first time period.

22. The apparatus of claim 21, wherein the one or more processors generate the performance data based on monitoring an application which performs the transactions.

* * * * *